United States Patent
Webster et al.

(10) Patent No.: US 10,928,407 B2
(45) Date of Patent: *Feb. 23, 2021

(54) DYNAMICALLY CONTROLLING AN AUTOMATED SYSTEM

(71) Applicant: LONZA LIMITED, Visp (CH)

(72) Inventors: Dale Webster, Thurmont, MD (US); Evan Carpenter, Valley Stream, NY (US)

(73) Assignee: Lonza Limited, Visp (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/939,121

(22) Filed: Jul. 27, 2020

(65) Prior Publication Data

US 2020/0355709 A1 Nov. 12, 2020

Related U.S. Application Data

(63) Continuation of application No. 15/878,930, filed on Jan. 24, 2018, now Pat. No. 10,768,190.
(Continued)

(51) Int. Cl.
*G01N 35/00* (2006.01)
*B25J 9/00* (2006.01)
(Continued)

(52) U.S. Cl.
CPC ........ *G01N 35/0099* (2013.01); *B25J 9/0084* (2013.01); *B25J 9/0096* (2013.01);
(Continued)

(58) Field of Classification Search
CPC ............ G01N 35/0099; G01N 35/028; G01N 2035/0091; G01N 35/00722;
(Continued)

(56) References Cited

U.S. PATENT DOCUMENTS 6,292,715 B1  9/2001 Rongo
6,594,537 B1  7/2003 Bernstein et al.
(Continued)

FOREIGN PATENT DOCUMENTS

WO   2015038910 A1   3/2015

OTHER PUBLICATIONS

Chu et al., A LC-MS integration approach in life science automation: Hardware integration and software integration, IEEE, 2015, p. 979-984 (Year: 2016).*

(Continued)

*Primary Examiner* — McDieunel Marc
(74) *Attorney, Agent, or Firm* — Medler Ferro Woodhouse & Mills PLLC

(57) ABSTRACT

Systems and methods for dynamic automation are provided. An automation module may receive at least one map template that is selectable by a user. Based on the map template, the automation module may dynamically generate a robot deck layout map and/or procedure and also generate a series of robotic commands for a robot. The robotic commands may then be passed to the robot to carry out the automation. Accordingly, the automation may be entirely dynamic, without the need for a user to pre-program or pre-assemble all of the robotic commands prior to the automation. The automation module may thus be able to build, in real-time and/or on the fly, the robotic commands based only on the at least one map template that was selected by the user.

14 Claims, 18 Drawing Sheets

Related U.S. Application Data

(60) Provisional application No. 62/451,470, filed on Jan. 27, 2017.

(51) Int. Cl.
  B25J 9/16 (2006.01)
  B25J 21/00 (2006.01)

(52) U.S. Cl.
  CPC .......... *B25J 9/1669* (2013.01); *B25J 9/1682* (2013.01); *B25J 21/00* (2013.01); *G01N 35/00722* (2013.01); *G01N 2035/0091* (2013.01); *Y10S 901/02* (2013.01)

(58) Field of Classification Search
  CPC .......... G01N 33/5008; G01N 21/6428; G01N 2015/149; G01N 21/6486; G01N 35/1002; G01N 35/1074; C12Q 2600/166; C12Q 1/6811; B01L 2200/021; B01L 3/0293; B01L 3/5025; B01L 2200/143; B01L 9/56; G16H 10/40; G16H 40/40; G16H 40/67; B25J 9/0084; B25J 9/0096; B25J 9/162; B25J 9/1664; B25J 9/1697; B01J 2219/00691; B01J 2219/00315; C40B 40/08; C40B 50/06; F24F 11/30; G05B 2219/40269; Y10S 901/02
  See application file for complete search history.

(56) References Cited

U.S. PATENT DOCUMENTS

| | | | | |
|---|---|---|---|---|
| 6,746,864 | B1* | 6/2004 | McNeil | G01N 33/5302 356/417 |
| 9,034,257 | B2* | 5/2015 | Covey | G01N 35/028 422/68.1 |
| 2004/0202577 | A1 | 10/2004 | McNeil et al. | |
| 2007/0184546 | A1* | 8/2007 | Farrelly | G01N 35/04 435/286.3 |
| 2008/0020422 | A1 | 1/2008 | Wainwright et al. | |
| 2015/0309062 | A1* | 10/2015 | Covey | G01N 35/0099 506/9 |
| 2017/0350911 | A1* | 12/2017 | Covey | G01N 35/00722 |
| 2018/0217172 | A1* | 8/2018 | Webster | G01N 35/0099 |
| 2019/0291277 | A1* | 9/2019 | Oleynik | B25J 9/163 |
| 2020/0105409 | A1* | 4/2020 | Kochar | G06Q 10/10 |

OTHER PUBLICATIONS

Unver, System Architectures Enabling Reconfigurable Laboratory-Automation Systems, 2011, IEEE, p. 909-922 (Year: 2011).*
Chu et al., Flexible robot platform for sample preparation automation with a user-friendly interface, 2016, IEEE, p. 2033-2038 (Year: 2016).*
Chu et al., Application of dual-arm robot in biomedical analysis: Sample preparation and transport, 2015, IEEE, p. 1-5 (Year: 2015).*
Michael, et al., "Technology Review: A Robotic Platform for Quantitative High-Throughput Screening," ASSAY and Drug Development Technologies 6:637-657 (2008).
Xie et al., Molecular dynamics simulations of the cytolytic toxin Cyt1A in solution, IEEE, p. 2005, pg. (Year: 2005).
IRB 840 gantry robot series, 1998, Internet p. 1-7 (Year: 1998).
Harashima, Sensor Based Robot Control Systems, 1990, IEEE, p. 1-6 (Year: 1990).
Lee et al. A Dynamic Programming Approach to a Reel Assignment Problem of a Surface Mounting Machine in Printed Circuit Board Assembly, 1998, IEEE, p. 227-232 (Year: 1998).
Friedrich, Increased Reliability by Effective Use of Sensor Informaton: A Shop Floor Applicaiton of Sensor-aided Robotic Handling, 1997, IEEE, p. 359-364 (Year: 1997).
Cheng et al., Adaptive Synchronization Control of a Robotic Manipulator Operating in an Intelligen Workcell, 1990, IEEE, p. 119-126 (Year: 1990).
Hoffman et al., Optimization of Underfilling Through software management of process control, 1997, IEEE, p. 1-11 (Year: 1997).
Suckau et al., Automation of MALDI-TOF Analysis for Prptenomics, 1999, Internet. p. 1-5 (Year: 1999).
International Search Report (PCT/ISA/210) issued in PCT Application No. PCT/US 18/15020 dated Apr. 17, 2018 (three (3) pages).
English-language Written Opinion (PCT/ISA/237) issued in PCT Application No. PCT/US 18/15020 dated Apr. 17, 2018 (five (5) pages).

* cited by examiner

REACTION TIME SUMMARY STATISTICS OVER 12 ASSAYS

| STANDARD EU/mL | MEAN REACTION TIME | | STANDARD DEVIATION OVER ASSAYS | | POOLED %CV AMONG REPLICATE WELLS | |
|---|---|---|---|---|---|---|
| | MANUAL | AUTO | MANUAL | AUTO | MANUAL | AUTO |
| 50 | 481 | 536 | ±28 | ±29 | 2.9% | 2.8% |
| 5 | 794 | 815 | ±29 | ±24 | 2.2% | 1.2% |
| 0.5 | 1,371 | 1,377 | ±38 | ±28 | 1.8% | 1.1% |
| 0.05 | 2,60 | 2,576 | ±77 | ±79 | 1.1% | 2.2% |
| 0.005 | 3,904 | 3,991 | ±166 | ±213 | 2.4% | 1.4% |

FIG. 14

DATA DEMONSTRATING A LARGE-SCALE IMPLEMENTATION OF A ROBOTIC PIPETTING SOLUTION

| | SAMPLE SIZE | PASSING | AVERAGE | % PASSING |
|---|---|---|---|---|
| STANDARD CURVE CORRELATION | 25,819 | 25,734 | -0.999 | 99.67% |
| STANDARD CURVE SLOPE | 25,819 | 25,734 | -0.241 | 99.67% |
| AVERAGE STANDARD %CV | 129,095 | | 1.07% | |
| ASSAY PASS/FAIL | 542,199 | 527,954 | | 97.40% |
| AVERAGE SAMPLE %CV | 204,394 | | 1.19% | |

*FIG. 18*

DYNAMICALLY CONTROLLING AN AUTOMATED SYSTEM

CROSS REFERENCE TO RELATED APPLICATIONS

This application is a continuation of U.S. application Ser. No. 15/878,930, filed Jan. 24, 2018, now U.S. Pat. No. 10,768,190, issued Sep. 8, 2020, which claims priority to and the benefit of U.S. Provisional Application No. 62/451,470, filed Jan. 27, 2017, the disclosures of both of which are expressly incorporated herein by reference in their entireties.

BACKGROUND ART

The invention relates to systems and methods for dynamic automation, such as automation related to endotoxin assays.

Robotic systems and components have been implemented widely in various industries. For example, robotic systems and components are well known in manufacturing of durable and consumer goods such as automotive, electronics, pharmaceuticals and biotech, and other consumer goods. Additionally, robotic systems and components are often employed in biotech, medical, and laboratory settings such as to perform assays. These robotic systems and components—whether in a laboratory or manufacturing setting—are typically controlled using static automation scripts as will be detailed herein.

Assays are investigative procedures in laboratory, medicine, pharmacology, environmental biology, or molecular biology for qualitative assessment or quantitative measurement of the presence, amount, or functional activity of a target entity (e.g., the "analyte"). The analyte may be a drug, a biochemical substance, or a cell in an organism or organic sample and the measured entity may be the analyte. Assays usually aim to measure an intensive property of the analyte and express it in relevant measurement units, such as molarity, density, functional activity in enzyme international units, degree of some effect in comparison to a standard, etc.

Endotoxins are a type of pyrogen and are natural compounds found in the outer cell membrane of Gram-negative bacteria and may impact numerous biological activities. The Limulus Amebocyte Lysate (LAL) test was commercially introduced in the 1970s. LAL is derived from the blood cells, or amebocytes, of horseshoe crabs. It was observed that blood cells from horseshoe crabs were found to clot in the presence of endotoxin, and this technology was used in the development of endotoxin detection assays. Today, endotoxin tests are performed on raw and in-process materials, and for the final release of products in the pharmaceutical and medical device industries.

Assay methods, including endotoxin assays, may be performed or facilitated, in part, using computer system(s) configured to control laboratory robots. These robots may be configured to move biological or chemical samples and laboratory equipment with relative precision and efficiency. The laboratory robots, however, may be pre-programmed with predetermined robot automation scripts by laboratory technicians for each assay or test the robots perform, and thus, they are static and inflexible. For example, static robotic control involves predetermining where the components will be positioned, then developing the robotic control code required for the item to be created. The same components must be positioned at the same locations each time the control code is executed, which means that processing (and the item that is created) is always the same, and to create a different item, new robotic control code must be developed.

In this way, the robotic scripts are static (e.g., once a script is created, it runs the same way each and every time without any flexibility), creating a dedicated script for each assay or test can be tedious and time consuming, and script creation requires specialized scripting knowledge. Moreover some scripts may require some "babysitting" with human intervention to apply, for example, manual actions at various points in the assay or testing process.

SUMMARY OF THE INVENTION

According to one aspect of the disclosure, a system for dynamic automation includes a robot and at least one computing device for executing stored instructions to receive at least one template, dynamically generate a plurality of robotic commands based on the received at least one template, and send the generated plurality of robotic commands to the robot for performing the dynamic automation.

According to another aspect of the disclosure, a method for dynamic automation includes receiving, using at least one computing device, at least one template, dynamically generating a plurality of robotic commands based on the received at least one template, and sending the generated plurality of robotic commands to a robot for performing the dynamic automation.

According to yet another aspect of the disclosure, a system for dynamic automation includes a robotic apparatus having a robot and a robot deck and at least one computing device for executing stored instructions to receive a first map template of a first microplate used for a first assay, dynamically generate a plurality of robotic commands based on the received first map template, and send the generated plurality of robotic commands to the robot of the robotic apparatus for performing the dynamic automation.

According to aspects of the disclosure, the at least one computing device dynamically determines deck layout information for the robot deck based on the first map template, the robot deck having one or more stations for conducting the first assay associated with the first microplate of the first map template. Moreover, the deck layout information includes one or more of: (i) what equipment is to be used for the dynamic automation at each of the one or more stations on the robot deck, (ii) where the equipment is to be positioned at each of the one or more stations on the robot deck, and (iii) calculations of one or more measurements associated with the equipment. Additionally, the at least one computing device receives confirmation that the robot deck has been set up in accordance with the dynamically determined deck layout information. The at least one computing device may also process results of the automation and stores the results in memory. The at least one computing device receives a second map template of a second microplate different from the first microplate used for a second assay, and the plurality of the robotic commands being dynamically generated based on the received first and second map templates. Moreover, the first assay and the second assay are conducted during a same automation run. The same automation run dynamically automates the first assay and the second assay. The first assay and the second assay are endotoxin assays. In addition, the one or more stations may include one or more of: (i) a reagent rack station, (ii) a sample tube rack station, (iii) a microplate holder station, (iv) a microplate warmer station, and (v) a pipette tip holder station. The equipment includes one or more of: (i) at least one trough, (ii) at least one vial, (iii) at least one standards tube, (iv) at least one auxiliary tube, (v) at least one sample tube, and (vi) at least one microplate reader. Moreover, the first map template has a grid with a plurality of cells, each of the cells corresponding to a location of a well on the first microplate. The first map template and the second map template may be constructed by a user prior to the dynamic automation. Additionally, the at least one computing device displays on an interface the first map template and the second map template for preview.

According to an additional aspect of the disclosure, a method for dynamic automation includes receiving, using at least one computing device, a first map template of a first microplate used for a first assay, dynamically generating, using the at least one computing device, a plurality of robotic commands based on the received first map template, and sending, using the at least one computing device, the generated plurality of robotic commands to a robot for performing the dynamic automation.

According to further aspects of the disclosure, the method further includes dynamically determining, using the at least one computing device, deck layout information for a robot deck based on the first map template, the robot deck having one or more stations for conducting the first assay associated with the first microplate of the first map template. Moreover, the deck layout information includes one or more of: (i) what equipment is to be used for the dynamic automation at each of the one or more stations on the robot deck, (ii) where the equipment is to be positioned at each of the one or more stations on the robot deck, and (iii) calculations of one or more measurements associated with the equipment.

According to yet another aspect of the disclosure, a method for dynamic automation is provided, where the method includes receiving, using at least one computing device, at least one template, dynamically generating, using the at least one computing device, a plurality of robotic commands based on the received at least one template, and sending, using the at least one computing device, the generated plurality of robotic commands to a robot for performing the dynamic automation.

BRIEF DESCRIPTION OF THE DRAWINGS

FIG. 4 illustrates a template selection interface of an automation module in accordance with one or more aspects of the invention.

FIGS. 5 to 10 illustrate robot deck setup interfaces of an automation module in accordance with one or more aspects of the invention.

FIG. 14 illustrates a chart in accordance with one or more aspects of the invention.

FIG. 18 illustrates a chart in accordance with one or more aspects of the invention.

DETAILED DESCRIPTION OF EMBODIMENTS OF THE INVENTION

Figure 1:
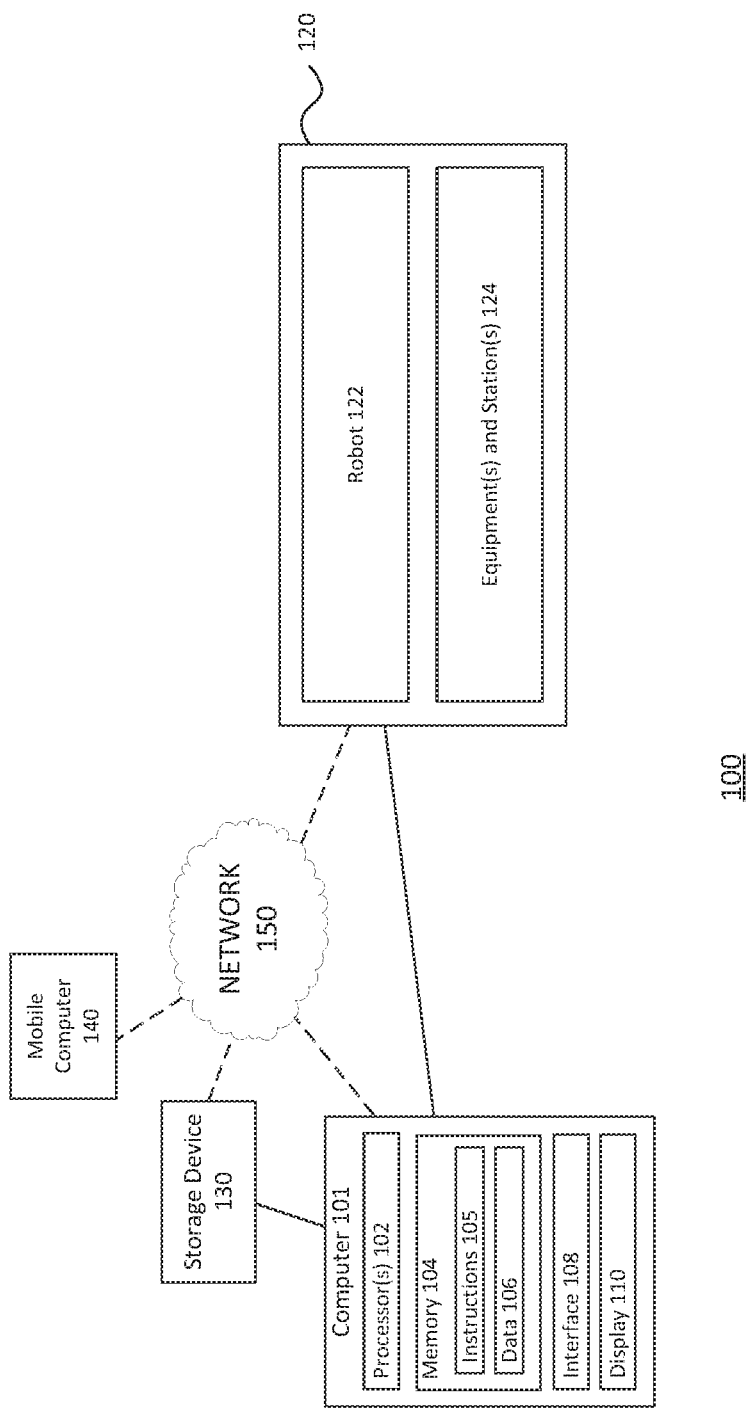
FIG. 1 illustrates an example system in accordance with one or more aspects of the invention.

The invention relates to systems and methods for dynamically controlling an automated system. For example, the automated system may include one or more computing devices, a robotic apparatus, and equipment/stations for performing a particular automation function, such as one or more assays, manufacturing steps, or other desired function.

According to aspects of the disclosure, the automation module implemented on one or more computing devices may script a robotic apparatus so that it can build its own automation coding instructions on the fly by creating a unique series of control commands that are keyed to a particular template, such as a map of a microplate for a particular assay (e.g., location of each well in the microplate) to be run, map of a location on a consumer good body (e.g., location on an automobile body or electronic device body), or any other location based map. The user, such as a laboratory technician, may select the template in an automation module, which may then take the template and dynamically generate or build a robot deck layout map and/or procedure and also build the unique series of control commands for automation.

In one example and as will be further described below, the automation module may prompt a user to select and input at least one template for running the automation, where each template, for example, may correspond to a respective endotoxin assay. The template may be anything (e.g., script, print, spoken words, images, diagrammatic representations, etc.) that is capable of indicating the type of automation result. The template may be created from scratch by the user and saved on the system for future use. With respect to endotoxin assays, the template may be a map-based template indicating the location of each well of a microplate. The automation module may display a preview of the selected template(s).

Once the selected template(s) are input and confirmed by the user, the automation module may prompt the user to set up a robot deck of the robotic apparatus to conduct the one or more assays. The robot deck layout map and procedure may be dynamically generated based on the selected template(s). For instance, it may instruct the user where to place specific laboratory equipment on the deck and the module may also calculate associated assay measurements for each of the laboratory equipment, such as requisite volumes and other measurements for the samples, materials, etc. associated with the assay for the convenience of the user. The user then confirms the robot deck layout and runs the automation.

The module may then dynamically generate or build the series of robotic commands for the robotic apparatus to execute the automation based on the above-described template(s) selected by the user. The robotic commands are passed to the robotic apparatus to perform the assay(s). During the assay(s), the user may be able to monitor the process and abort if necessary. Data collected during the assay(s) may be stored in memory and analyzed in real-time.

In at least this way, the automation of the disclosure is entirely dynamic, without the need for a user to pre-program or pre-assemble all of the robotic commands for the robotic apparatus prior to the automation. Dynamic robotic control, for example, thus involves providing a snapshot (e.g., a template) of the item to be created, or test to be performed, etc. The automation evaluates the snapshot and may determine what is required to build the item, whereby the system dynamically generates information (i) regarding the components that are required, (ii) where the components are located, (iii) and the robotic control code to create the item. The user, for example, can position the components at the locations specified by the automation software. The item that is created by dynamic robotic control varies based on the snapshot. Thus, the automation module according to one or more aspects of the invention is able to build, in real-time, the robotic commands based only on the selected template(s). Moreover, the invention is advantageous in that the automation module automatically and dynamically constructs the deck layout of robotic apparatus for the user and also calculates all the necessary measurements associated with the laboratory equipment used during the assay(s), which would have been otherwise hand-calculated by the user. Accordingly, not only does the automation module make everything associated with the automation convenient for the user, but also reduces automation time and error when compared to assays or tests that are performed manually.

FIG. 1 illustrates an example system 100 in accordance with one or more aspects of the invention. The system 100 may include a computer 101 directly connected to a robotic apparatus 120 and/or connected to the robotic apparatus 120 via network 150 (as depicted by the dashed line). The system 100 may also include storage device 130 directly connected to the computer 101 or connected to the computer 101 via network 150 (as shown by the dashed line). Mobile computer 140 may also be connected to the network 150.

For example, the computer 101 includes one or more processors 102, memory 104, e.g., permanent or flash memory (which includes instructions 105 and data 106), an interface 108, and a display 110. The processor 102 instructs the various components of the computer 101 to perform tasks based on the processing of certain information, such as instructions 105 and/or data 106 stored in the memory 104. The processor 102 may be any standard processor, such as a central processing unit (CPU), or may be a dedicated processor, such as an application-specific integrated circuit (ASIC) or a field programmable gate array (FPGA) or an industrial process controller. Memory 104, whether permanent or flash, may be any type of hardware (e.g., ROM, RAM, CD-ROM, hard drive, write-capable, read-only, etc.) configured to store information accessible by the processor 102, such as instructions 105 and data 106, which can be executed, retrieved, manipulated, and/or stored by the processor 102. The instructions 105 stored in memory 104 may include any set of instructions (e.g., "steps" or "algorithm" associated with software) that can be executed directly or indirectly by the processor 102. The data 106 stored in memory 104 may be retrieved, stored or modified by the processor 102, for example, in accordance with the instructions 105. Interface 108 may be a particular device for interfacing with the computer 101 (e.g., a field-mounted instrument, processor-to-processor communication, keyboard, mouse, touch sensitive screen, camera, microphone, etc.), a connection or port (e.g., data port, USB, zip drive, card reader, CD driver, DVD drive, etc.), and/or software (e.g., graphical user interface) that allows the reception of information and data. The display 110 may be any suitable type of device capable of communicating data to a user, such as liquid-crystal display (LCD), light emitting diode (LED), and plasma screens.

Robotic apparatus 120 may be used in a laboratory or other desired setting such as manufacturing and includes a robot 122 and equipment/station(s) 124. The robot 122 is capable of carrying out a complex series of actions automatically and programmable by a computing device. In at least that regard, the robot 122 may have components similar to the computer 101, such as a processor, memory, and different types of interfaces, for executing programmable instructions. The robot 122 may also be configured to handle equipment between available stations with a mechanical instrument, such as a robotic arm, gripper, pipetting tool, etc.

In some embodiments, the robot 122 may be used or implemented for manufacturing processes, as described above. For example, the robot 122 may dynamically automate the assembly process of an automobile part. In another example, the robot 122 may dynamically automate the testing of an electronic component, microchip, circuits, etc.

In other embodiments, the robot 122 may be used in a laboratory. In at least that regard, the equipment may include laboratory equipment such as microplates, troughs, vials, standards tubes, auxiliary tubes, sample tubes, microplate readers, pipettes, pipette tips, graduated cylinders, beakers, flasks, dishes, droppers, funnels, etc. In other embodiments, the equipment may include manufacturing tools and/or parts. The stations may include racks (e.g., reagent racks, sample tube racks), different types of holders (e.g., microplate holders, pipette tip holders), spinners for cultivating biological material, etc. For example, one or more microplate readers may be closely positioned to a side of the robot 122 in an area that is accessible by a robotic arm of the robot so as to allow the robot to pick up the microplates and place them in the microplate reader to scan the wells of the microplates and provide data to the automation module of the present disclosure to determine endotoxin level.

The storage device 130 may be configured to store a large quantity of data and may also be configured to transfer such data when requested or accessed by other components of the system 100, either through the network 150 or otherwise. For example, the storage device 130 may be a collection of storage components, such as ROM, RAM, hard-drives, solid-state drives, removable drives, network storage, virtual memory, multi-leveled cache, registers, CD, DVD, etc. In addition, the storage device 130 may be configured so other components of system 100, such as the computer 101, robotic apparatus 120, and/or mobile computer 140 can have access and provide data to it.

The mobile computer 140 may be a laptop (or any type of computer that is portable or mobile, such as an Ultrabook, smartphone, PDA, tablet computer, a wearable computing device, etc.) and also include components similar to the computer 101. The mobile computer may also have one or more processors, memory, user interfaces, wired or wireless network connection hardware, and other types of components associated with a mobile computing device. In one or more embodiments, the mobile computer 140 may also be configured to execute software supported by computer 101 and communicate with other components of system 100 via network 150.

Network 150 may be any suitable type of network, wired or wireless, configured to facilitate the transmission of data, instructions, etc. among the components of the system 100. For example, the network 150 may be a local area network (LAN) (e.g., Ethernet or other IEEE 802.03 LAN technologies), Wi-Fi (e.g., IEEE 802.11 standards), wide area network (WAN), virtual private network (VPN), global area network (GAN), or any combinations thereof.

It may be understood that the above-described computer 101 may be a laptop, a desktop computer, or any device capable of processing data and/or instructions and transmitting and/or receiving data. Moreover, it will be understood by those of ordinary skill in the art that any of the computing devices illustrated in FIG. 1 may actually include multiple processors, memories, instructions, data or displays that may or may not be stored within the same physical housing. And although some of the components of FIG. 1 are connected to the network 150, it may be understood that the components may also be connected to each other, in any suitable combination.

As described above, the robotic apparatus may be used for any type of automation, such as automations in the automotive, manufacturing, electronic industries, and the like. Thus, it may be understood, that the above-described components and below-described aspects of the disclosure may apply to automations in all industries, the laboratory being just one example. For instance, an operator may select and a computing device may receive one or more templates, such as an image, drawing, blueprint, CAD file, etc. of an automobile component that needs to be assembled. Based on the selected template(s), the computing device may dynamically generate a deck layout of where to place the different components to be assembled and how many of them are needed for the assembly. The computing device may also generate descriptions of the components. Moreover, the computing device based on the selected template(s), may dynamically generate a series of robotic commands for automating the assembly of the automobile component, without the need for the operator to uniquely script the entire assembly process for that automobile component.

Figure 2:
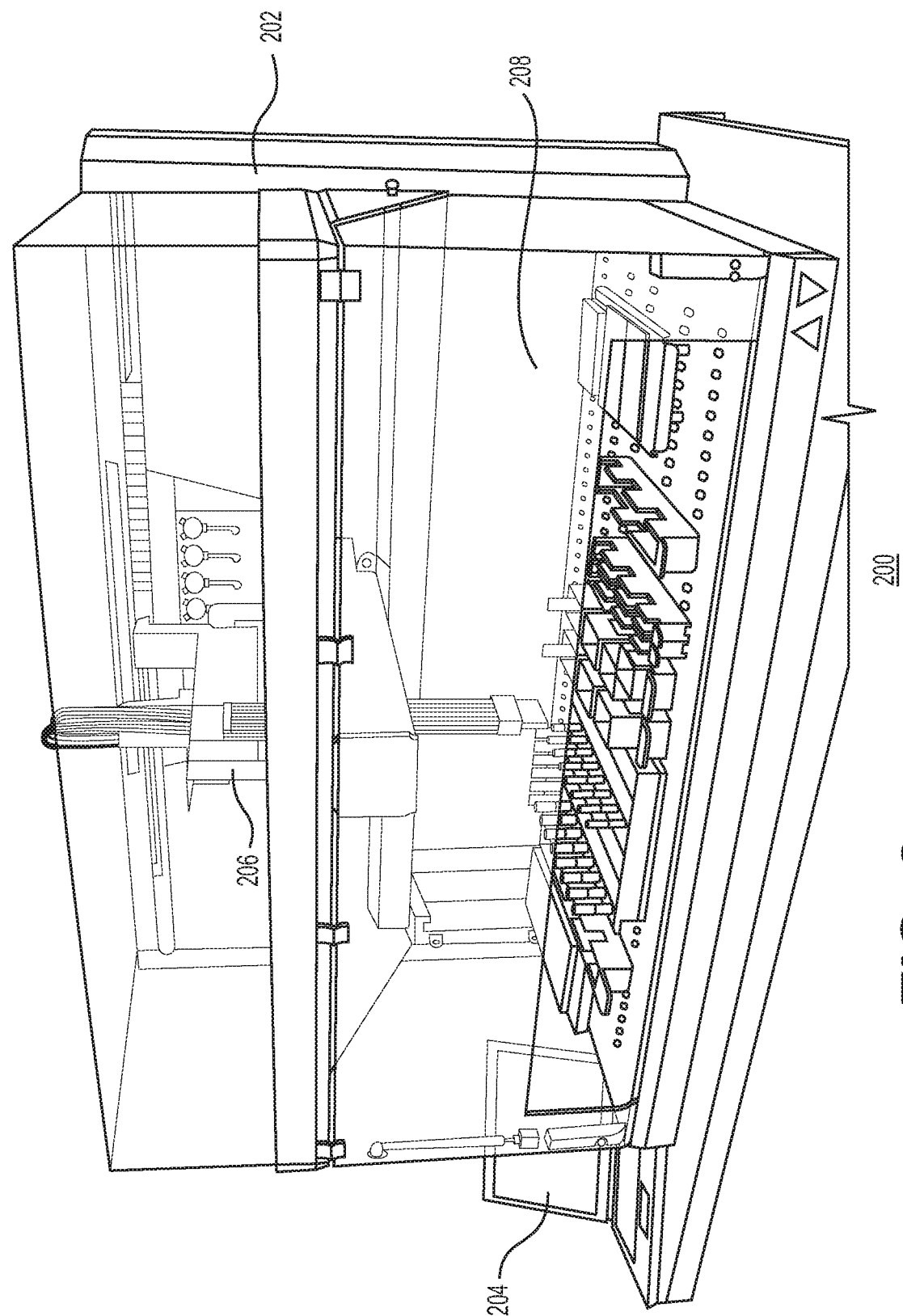
FIG. 2 illustrates an example robotic apparatus in accordance with one or more aspects of the invention.

FIG. 2 illustrates a perspective view 200 of an example robotic apparatus 202 in accordance with one or more aspects of the present disclosure. As shown, the robotic apparatus 202 may be used in a laboratory for laboratory related automations, such as assays, tests, experiments, etc. The robotic apparatus 202 may be connected to a computer, such as a laptop 204 in this example, which may be configured to instruct and/or command a robot 206 to perform various tasks associated with the assays, tests, experiments, etc. using the laboratory equipment/station(s) 208 arranged on a deck below the robot 206. For instance, a robotic command that is sent from the laptop 204 may instruct the robot 206 to transfer or measure out a quantity of liquid from one test tube to another test tube using the pipetting tool attached to the robot 206. It may be understood that the robot 206 and the laboratory equipment/station(s) 208, as illustrated, may be housed together in the robotic apparatus 202. Moreover, it may be understood that the equipment/station(s) 208 may be laid out in different ways on the deck of the robotic apparatus 202 based at least in part on the type of assay, test, and/or the experiment.

Figure 3:
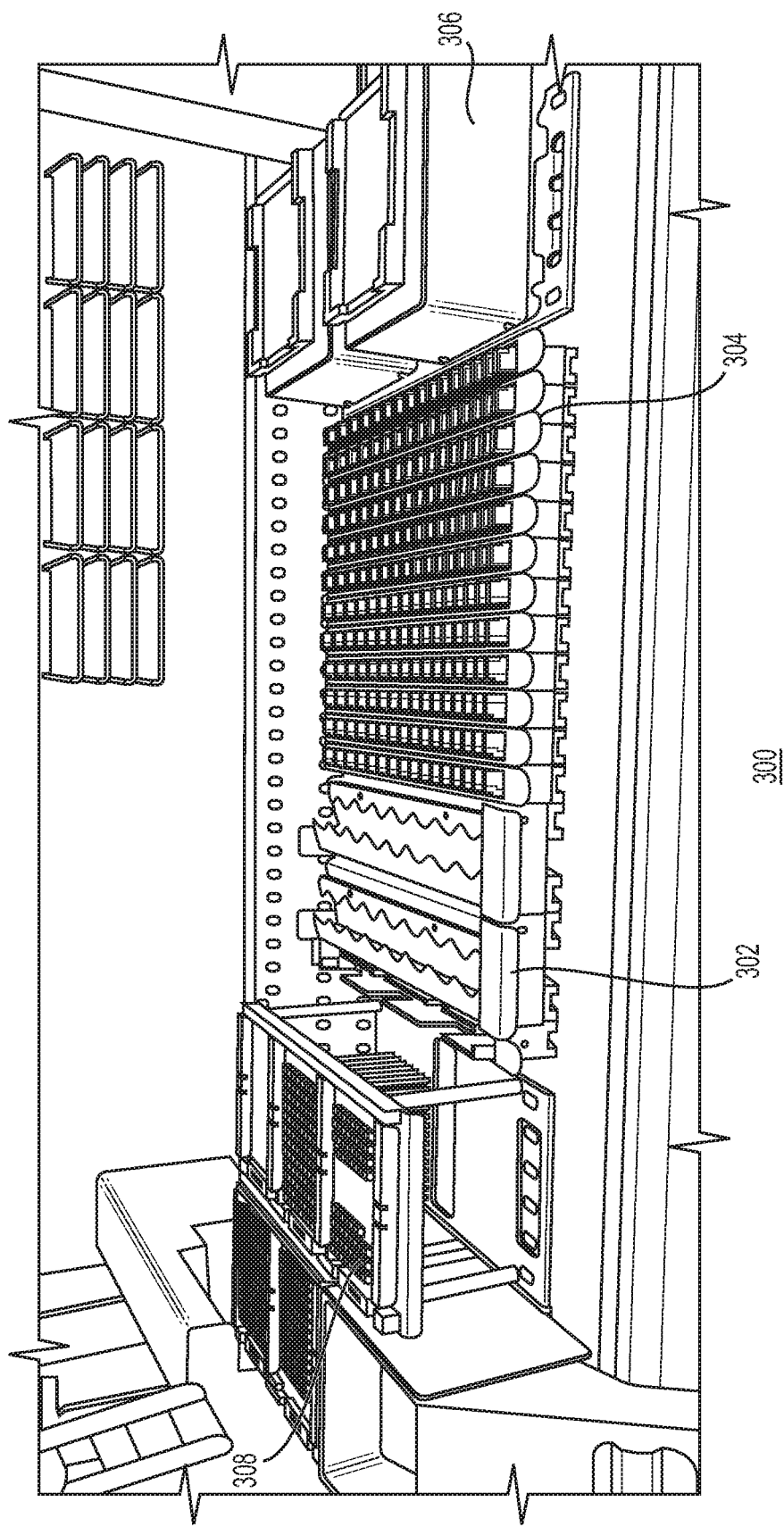
FIG. 3 illustrates example stations arranged on a deck of a robotic apparatus in accordance with one or more aspects of the invention.

FIG. 3 illustrates stations arranged on a deck 300 of a robotic apparatus in accordance with one or more aspects of the present disclosure. As illustrated, the deck may arranged thereon various laboratory equipment and/or stations for performing at least one reagent rack 302, multiple rows of sample tube racks 304, at least one microplate holder/warmer 306, and at least one pipette tip holder 308 configured to hold one or more pipette tips. As will be further described in the examples below, the illustrated configuration of the deck 300 may be used to dynamically automate performing endotoxin assays.

Figure 4:
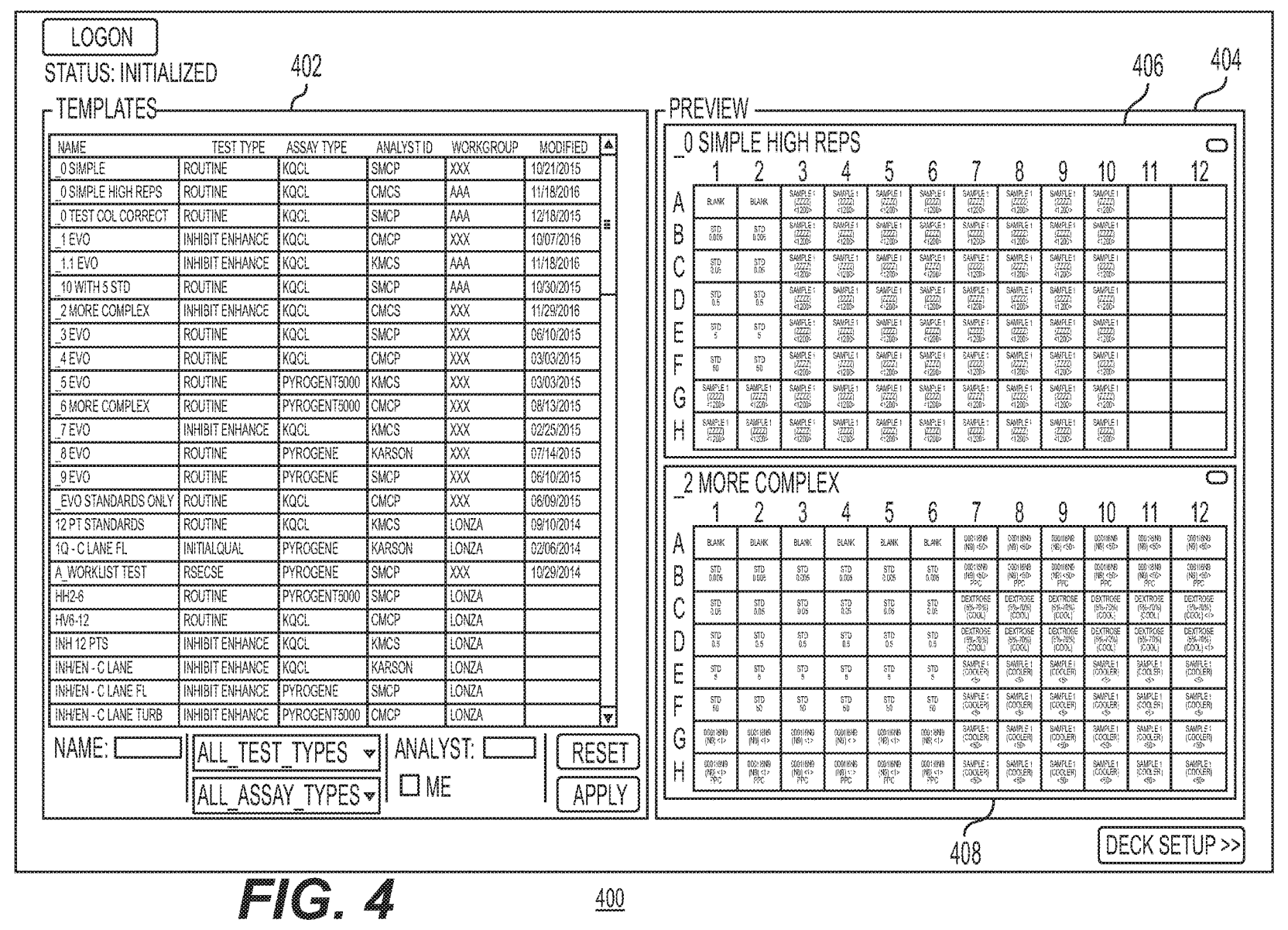

An automation module, which is executable on a computing device, may be used by a user, such as a laboratory technician, to dynamically automate the endotoxin assay processes. FIG. 4 illustrates a template selection interface 400 of the automation module in accordance with one or more aspects of the disclosure. For example, the template selection interface 400 can display a list of selectable microplate templates in a template list 402. As illustrated, the microplate templates in the list 402 may be organized and/or sorted by name, test type, assay type, analyst ID, workgroup, and/or the last date the template was modified. Moreover, at the bottom of the template list 402, a searching function may allow the laboratory technician to search the available templates by at least name, analyst, test type, and assay type.

At least one microplate template may be selected by the user for an automation run, where each microplate template may correspond to a different assay. In FIG. 4, for example, the lab technician selects two templates, the "_0 SIMPLE High Reps" template and the "_2 MORE COMPLEX" template, for the automation run. As shown, these two templates share the same assay type, but are different test types, the first template being a "Routine" test type and the second being an "InhibitEnhance" test type. In the preview box 404, located to the right of the template list 402, the lab technician may be able to preview the selected microplate templates. The preview is graphically presented in a form of a grid with each cell of the grid corresponding to a respective well of a microplate. Each of the cells may also contain information for the lab technician indicating what is contained in the microplate well. The information may indicate that the well is "BLANK," "STD" with a STD value, or the name of the sample. The displayed cells in the preview may also be color coded.

By way of example, the preview box 404 shows that grid 406 contains less "STD" grid cells than grid 408. In addition, it can also be seen that the microplate corresponding to the "_2 MORE COMPLEX" template has two additional columns (columns 11 and 12) compared to the microplate corresponding to the "_0 SIMPLE High Reps" template. As will be further described below, the unique and specific grid configurations of the microplate templates allow the automation module to determine on the fly which robotic commands to generate for performing the automation, e.g., the endotoxin assays.

It may be understood that the selectable templates may be stored in one or more databases either residing in the computing device executing the automation module or one or more databases residing offsite. For example, the templates may be stored in a storage device, such as the storage device 130 of FIG. 1, and accessible by the computing device, which may be similar to computer 101 of FIG. 1. And while the templates selected in FIG. 4 are depicted as grids containing a plurality of cells, a template may be any suitable indicator that can indicate to the automation module an end result of the automation, such as the desired samples (and their respective locations in a microplate) for endotoxin assays.

After the desired templates have been selected, previewed, and/or visually confirmed by the user, the user may proceed with the robot deck setup process. In other words, the automation module may dynamically determine, based on the selected templates, where and how much testing material is to be deposited and set up by the user in order to run the automation.

FIGS. 5 to 10 illustrate robot deck setup interfaces 500 to 1000 to help the user setup the robot deck in order to proceed with the automation. A deck setup interface, such as interface 500 illustrated in FIG. 5, may display at least three different components related to the set up process: (1) a deck layout 502, (2) selected block details box 504, and (3) a deck setup checklist 506.

Each of the blocks shown in the deck layout 502 corresponds to the physical location of a station on the robot deck.

For example, block 13 corresponds to the reagent rack 302 illustrated in FIG. 3. Block 21 in the deck layout 502 corresponds to the microplate holder/warmer 306 of FIG. 3. Block 19 corresponds to the sample tube racks 304, again shown in FIG. 3. Moreover, block 8 may correspond to the pipette tip holder 308. These blocks may be selected by the user, and upon selection, the selected block details box 504, for instance, may display the name of the laboratory equipment and/or carrier type, an associated description, as well as positioning and volume specifications of the equipment. Moreover, each of the items listed in the deck setup checklist 506, for example, is checked-off and confirmed before running the assays.

Figure 5:
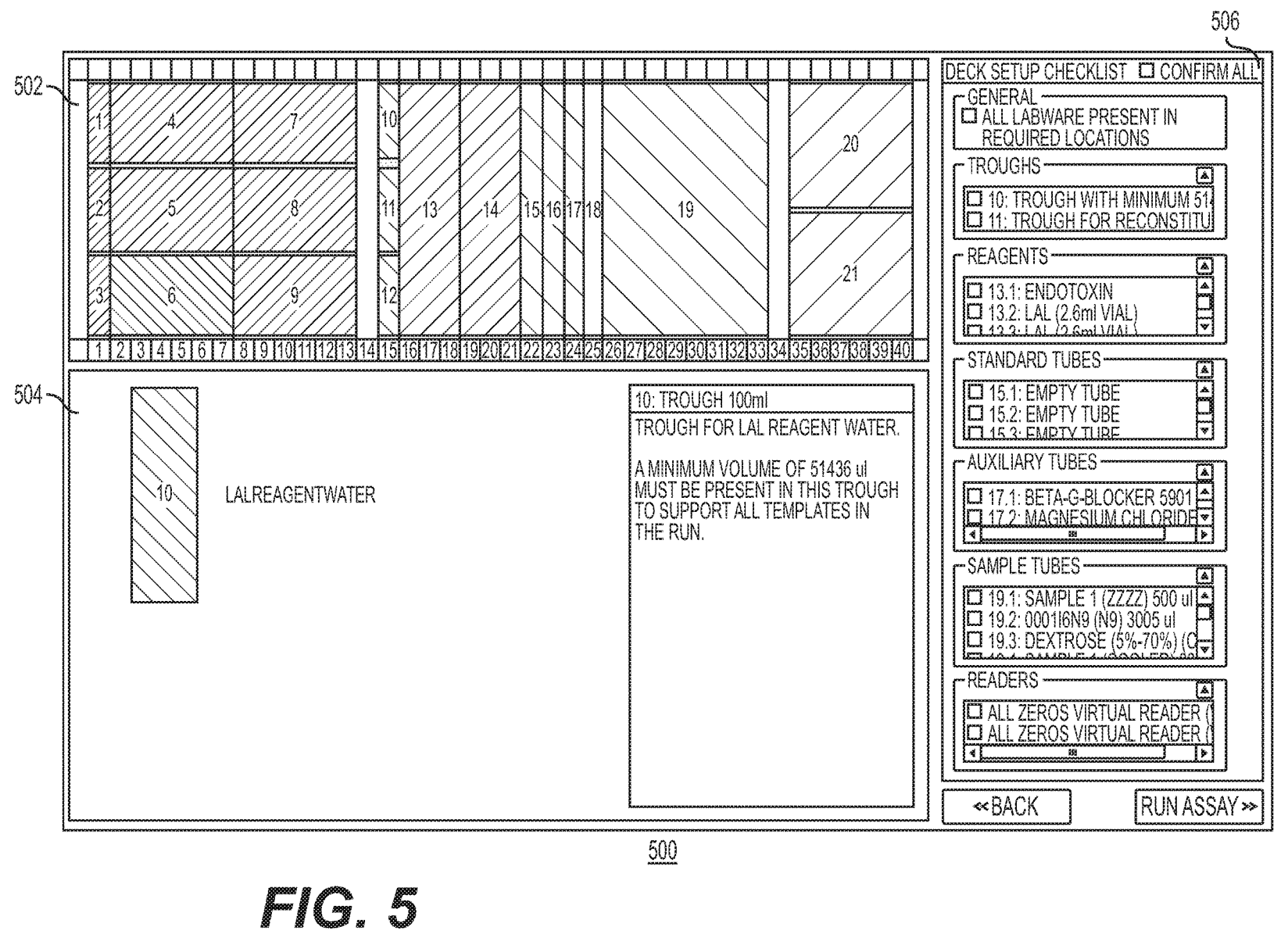

FIG. 5 shows the setup details associated with block 10 in the selected block details box 504. By way of example, it displays that a 100 ml Trough for holding LAL reagent water is to be set up at the location of block 10 on the robot deck. The selected block details box 504 also specifies that a minimum volume of 51436 µl must be present in the trough to support all the selected templates in the automated run.

Figure 6:
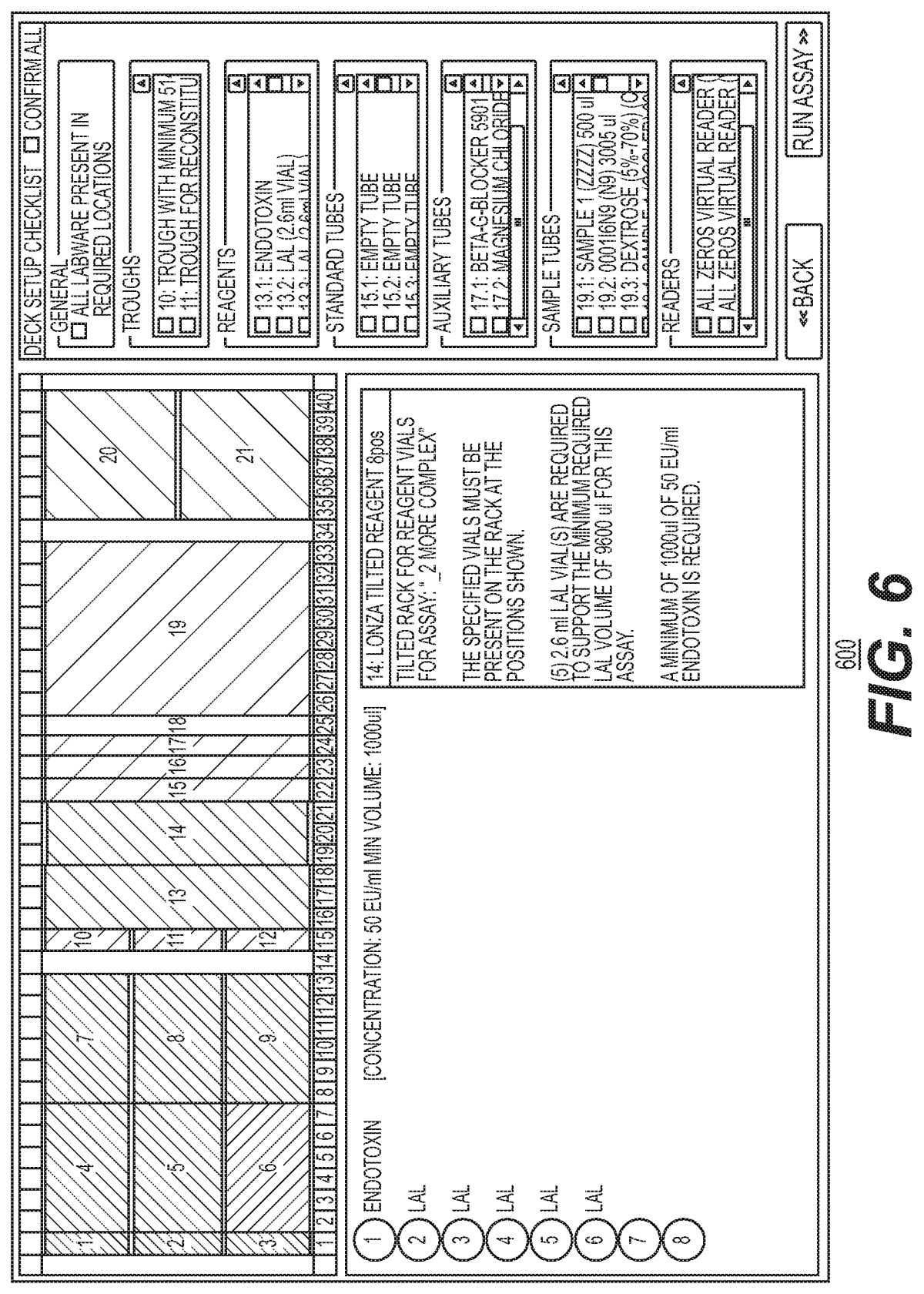

A selected block details box in FIG. 6 displays the setup details associated with block 14, which represents a reagent rack for holding reagent vials for assay "_2 MORE COMPLEX." The rack has 8 positions for 8 different vials, the first of which is to be set up to hold a minimum of 1000 µl of 50 EU/ml Endotoxin. The second, third, fourth, fifth, and sixth vials are 2.6 ml LAL vials that each supports a minimum required LAL volume of 9600 µl for the assay. The specified vials must be positioned by the lab technician at the positions shown in the selected block details box.

Figure 7:
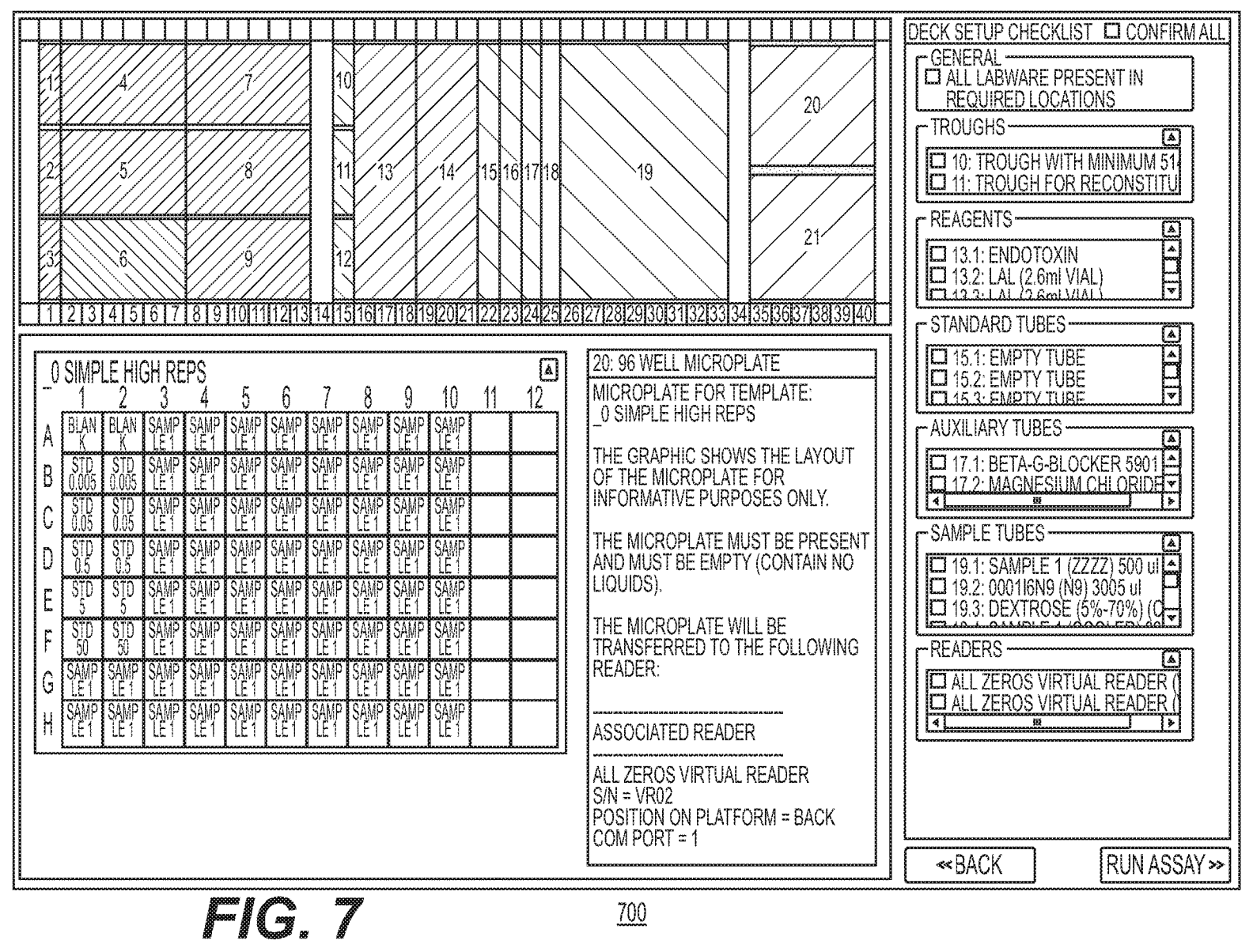

FIG. 7 illustrates robot deck setup interface 700 with a selected block details box that displays information related to block 20, which represents a well microplate. For example, it is indicated that the microplate is for the "_0 SIMPLE High Reps" template and the graphic on the left-hand side (which may be the same graphic shown in preview box 404 of FIG. 4) shows the layout of the microplate for informative purposes. Moreover, the selected block details box indicates that the microplate must be present and all the wells empty for the automation (e.g., contain no liquids) and also indicates that the microplate will be transferred to the "All Zeros Virtual" reader during the automation process.

Figure 8:
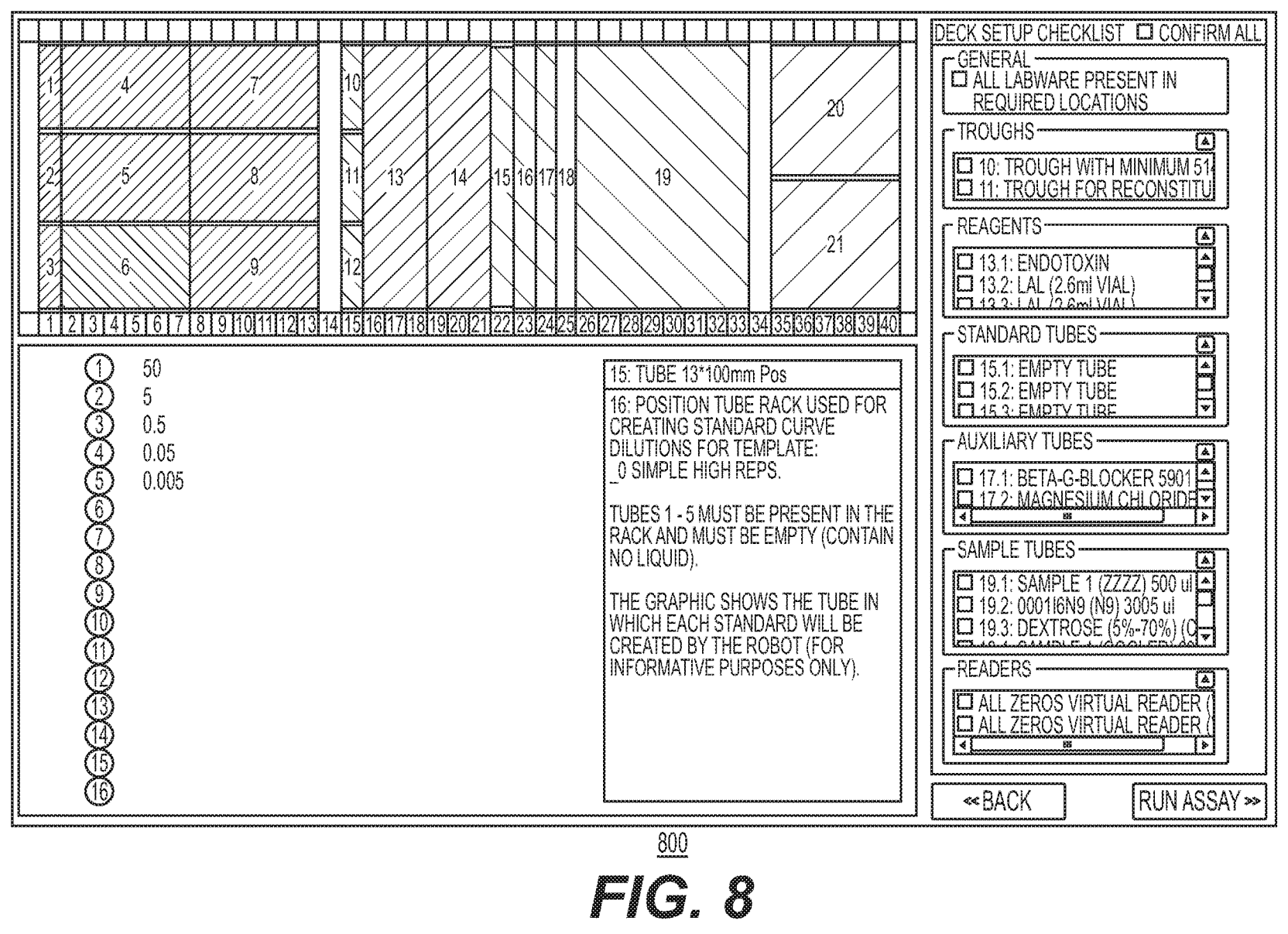

FIG. 8 shows a selected block details box of robot deck setup interface 800 displaying information related to block 15, which corresponds to a tube rack that may be configured to hold 16 different tubes. As illustrated, the selected block details box indicates that tubes 1 to 5 must be present in the rack and must be empty (e.g., contain no liquid). The tubes are to be used for creating standard curve dilutions for the "_0 SIMPLE High Reps" template. Moreover, the graphic on the left side of the selected block details box shows the tube in which each standard will be created by the robot and may be displayed for informative purposes.

Figure 9:
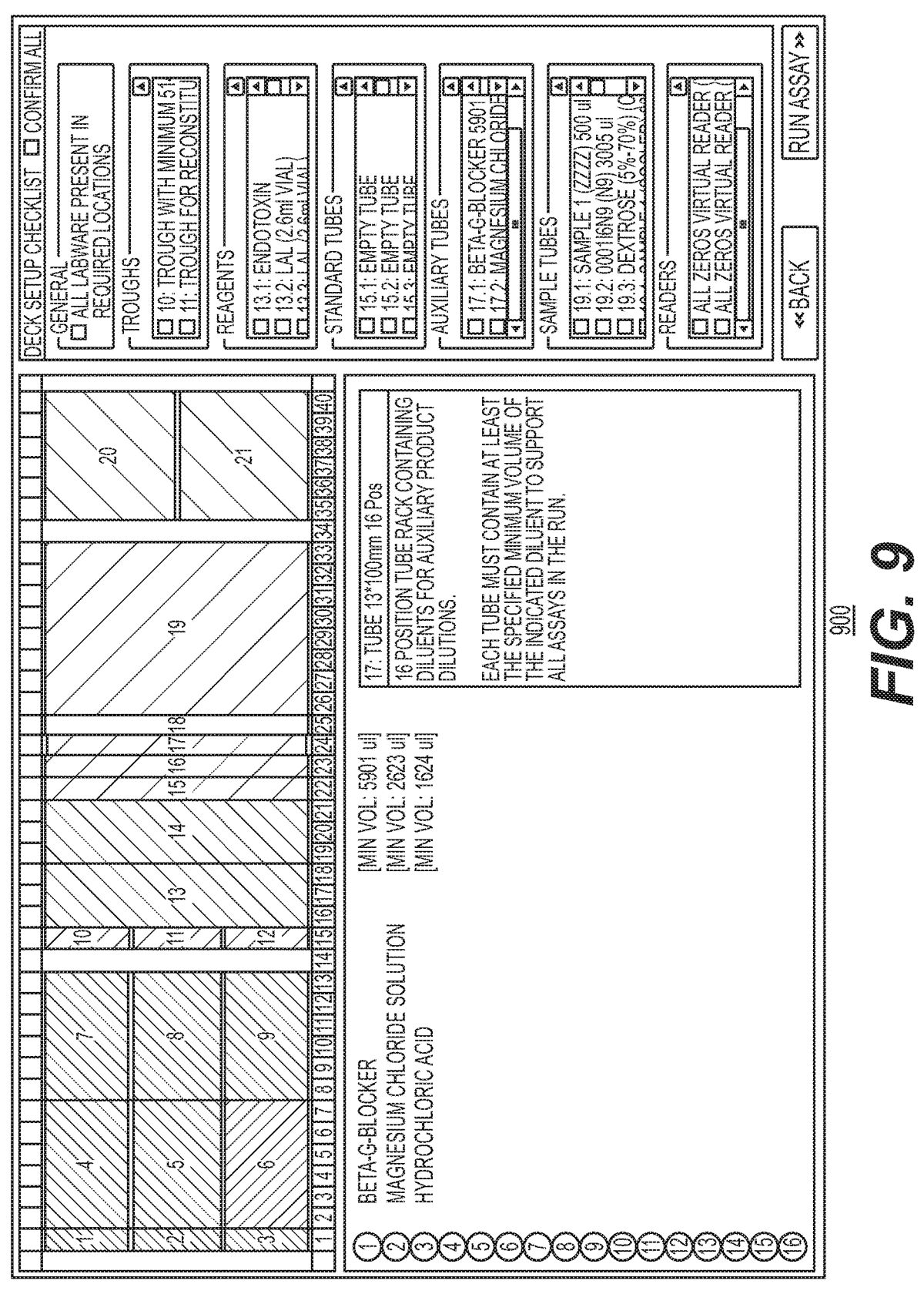

Similar to FIG. 8, FIG. 9 illustrates a robot deck setup interface 900 having a selected block details box that displays information related to a tube rack (corresponding to block 17) configured to hold 16 different tubes. The selected block details box indicates that the tubes are to contain diluents for auxiliary product dilutions and that each tube must contain at least the specified volume measurements of the indicated diluent to support all assays in the automated run. For example, tube 1 is to contain at least 5901 µl of beta-G-blocker. Tube 2 is to contain at least 2623 µl of magnesium chloride solution. Moreover, tube 3 is to contain at least 1624 µl of hydrochloric acid.

Figure 10:
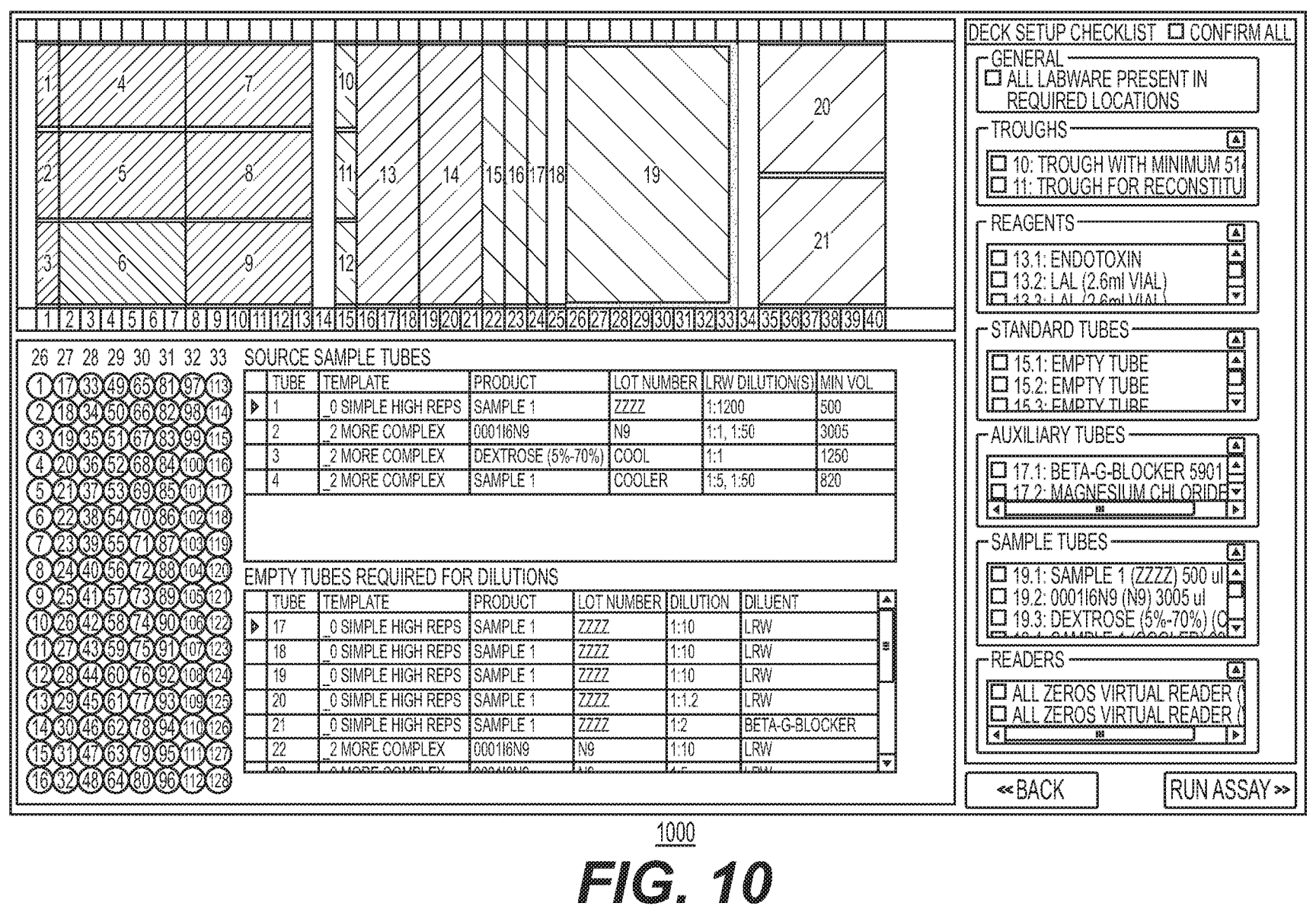

FIG. 10 illustrates a robot deck setup interface 1000 with a selected block details box displaying information related to block 19, which corresponds to the sample tube racks. The selected block details box contains information that empty tubes 17 to 30 are to be placed in the second column (column number 27) and that source sample tubes 1 to 4 are to be placed in the first column (column number 26), as shown in the graphic on the left-hand side of the selected block details box. For at least the convenience of the user and to prevent error, the source sample tubes are color coded.

As described above, the automation module builds the deck layout for the user before running the automation and automatically determines and provides information related to the laboratory equipment to be used for the deck layout, such as the name of the equipment, associated descriptions, as well as positioning and measurement specification information. The user may be able to view the information related to each of the equipment via the above-described robot deck setup interfaces.

In at least that regard, one example of a deck setup procedure of endotoxin assay automation may involve the user to first position a water trough and a LAL reconstitution trough on the robot deck, information for which may be viewed after selecting block 10 of the deck layout, e.g., deck layout 502 of FIG. 5. Then, the user may position the reagent vials, the information for which may be found upon selecting block 13. The user may next position the standards tubes on the robot deck, the information for which may be viewed when having selected block 15 (as is illustrated in FIG. 8). Thereafter, the user may position the sample tubes and dilution tubes according to the information associated with block 19 of the deck layout. The microplate for the assay may then be positioned based on the information corresponding to block 20 and/or 21 (depending on how many assays are run during automation). After all the laboratory equipment have been positioned according to the deck setup procedure and all of the measurements confirmed (e.g., checking-off all the items listed in the deck setup checklist), the user may begin the assay automation by selecting the "Run Assay" icon on the robot deck setup interface.

Figure 11:
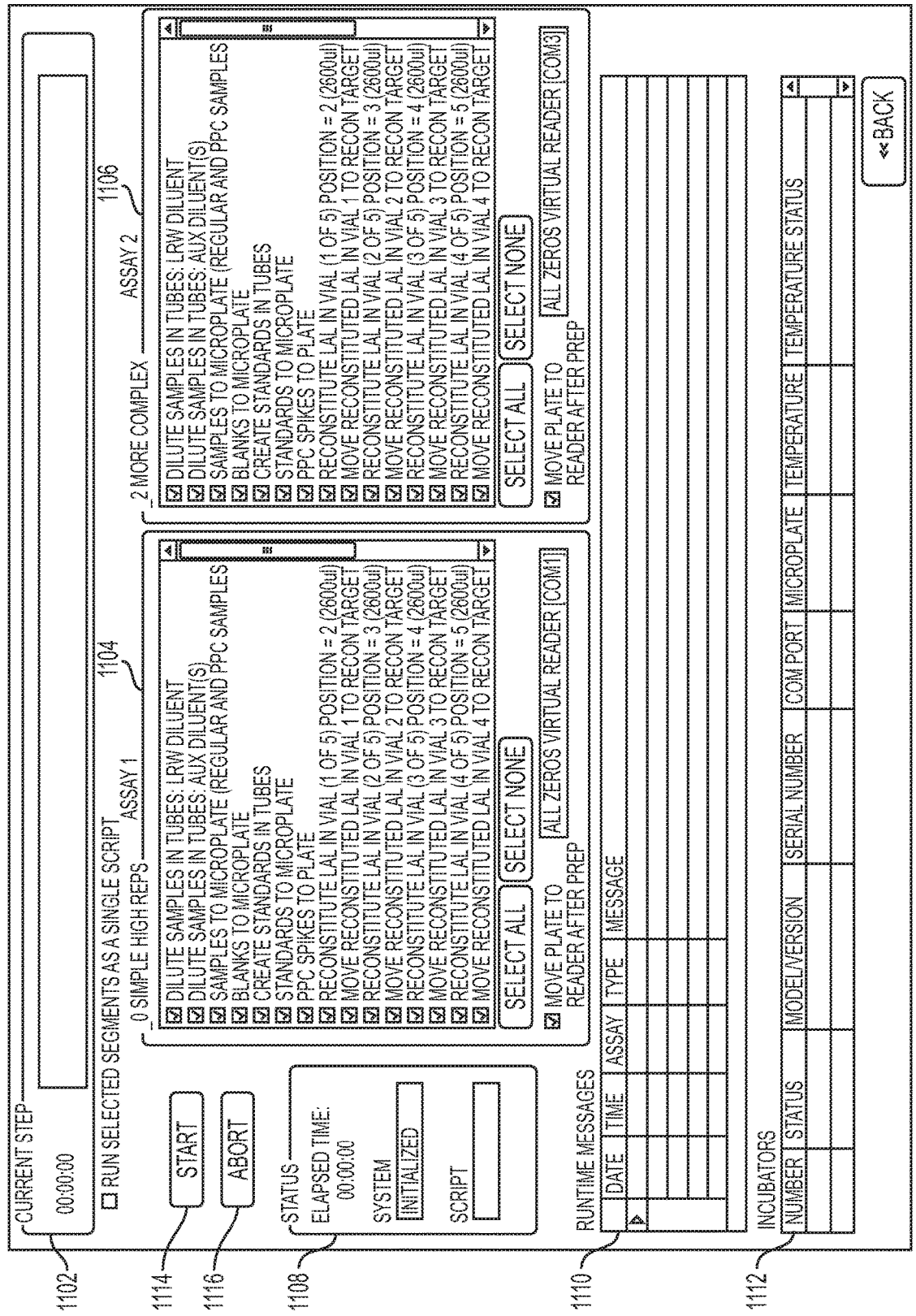
FIG. 11 illustrates a run assay interface of an automation module in accordance with one or more aspects of the invention.

FIG. 11 illustrates a run assay interface 1100 of the automation module in accordance with one or more aspects of the invention. The run assay interface 1100, for example, provides functionality to initiate and monitor the automated run. As shown, a current step box 1102 provides description of the step currently executing and an elapsed time for the particular step. Processing step boxes 1104 and 1106 display lists of the processing steps that are performed for each of the assays. A status box 1108 displays the total elapsed time, the system status and the status of the robotic command or script that is currently being executed. A runtime messages box 1110 displays informative runtime messages, which may be updated as the automated run progresses. An incubators box 1112 displays information and status associated with the on-deck microplate warmers. The automation may be initiated by selecting the start icon 1114 or aborted via the abort icon 1116.

Once the automated run is initiated, the user (e.g., the lab technician) may "walk away" and not have to babysit the assay process. Based on the selected microplate template(s) and the associate map(s) (e.g., the location of each well in the microplate), the automation module dynamically may do various things, such as build the deck layout for the lab technician, dynamically determine, calculate, and provide the requisite positions and measurements for the laboratory equipment, and also dynamically generate a series of robotic commands for the robot of the above-described robotic apparatus to execute all processing required to complete the run, including microplate transfers in and out of the microplate reader(s) at appropriate times.

For endotoxin assay automation, the automation module may dynamically generate the robotic commands to fully automate numerous steps of the assay(s) in accordance with one or more aspects of the disclosure. By way of example, the automation steps may include: (1) sample dilutions (e.g., applying all required sample dilutions), (2) placing samples on microplate(s), including positive product control (PPC) samples, (3) placing water blanks on microplate(s), (4) creating the dilutions required for the standard curves, (5) placing the standards dilutions on the microplate(s), (6) adding PPC spikes to the required wells on the microplate(s), (7) moving the microplate(s) to microplate reader for incubation, (8) reconstituting the reagent in each vial while the microplate(s) incubate, (9) removing the microplate(s) from the microplate reader and returning the microplate(s) to the plate warmer on the robot deck, (10) adding reagent to each required well on the microplate(s), (11) moving the microplate(s) to the microplate reader for processing, and (12) reading the microplate(s) and processing the results of the automation run following the placing of the microplate(s) in the microplate reader.

The processed results and corresponding data may be stored in one or more databases either residing in the computing device executing the automation module or one or more databases residing offsite. For example, the results and/or data may be stored in a storage device, such as the storage device 130 of FIG. 1, and accessible by a computing device, which may be similar to computer 101 of FIG. 1.

Figure 12:
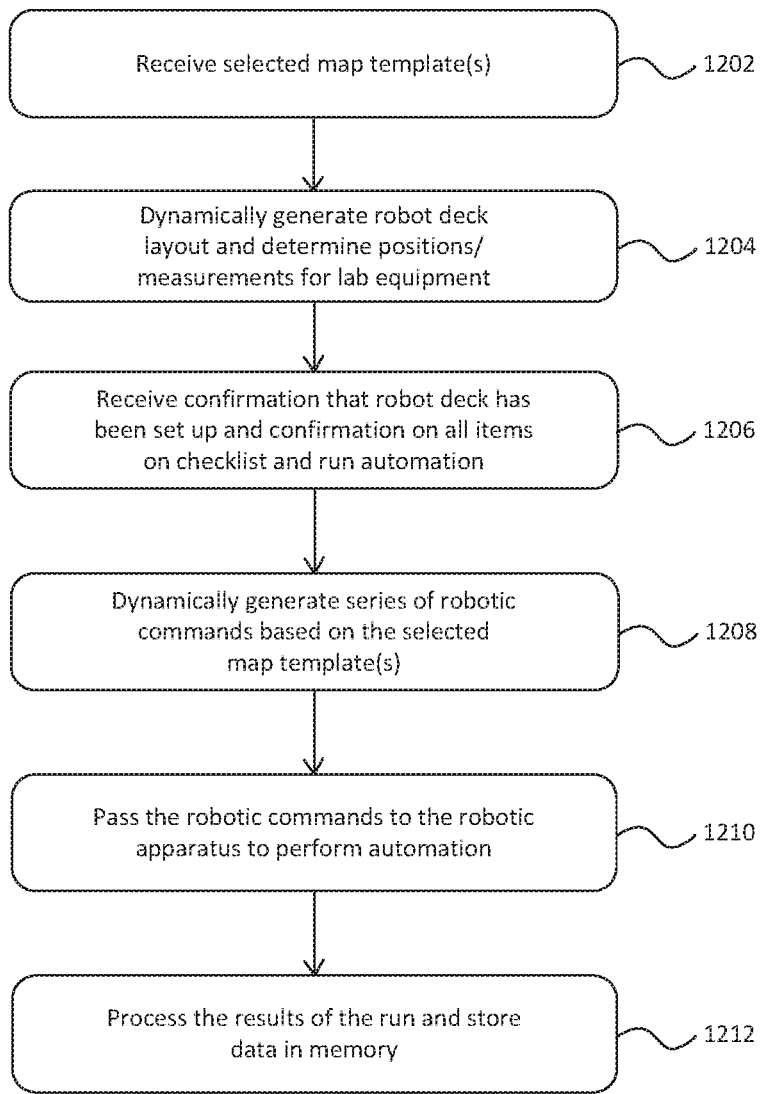
FIG. 12 illustrates a flow diagram in accordance with one or more aspects of the invention.

FIG. 12 illustrates a flow diagram for dynamically controlling an automated system, such as a system for performing the above-described endotoxin assays, in accordance with one or more aspects of the present disclosure. As describe above, the dynamic control may be performed and executed by an automation module. At step 1202, the automation module may receive at least one template selected by the user for the automation run. The template may be a map of a microplate to be used for each endotoxin assay, where the map specifies the location of each well of the microplate. At step 1204, the automation module may generate a robot deck layout procedure for the user and determine various positions/measurements for all the lab equipment to be used for the assay(s). At step 1206, the automation module may then receive confirmation that the robot deck has been set up properly and also receive confirmation on all the items listed on the deck setup checklist. Subsequently, the automation is run.

At step 1208, the automation module dynamically generates a series of robotic commands in order to perform the automation based on the selected map template(s) received in step 1202. Subsequently, at block 1210, the robotic commands are passed to the robotic apparatus. And at block 1212, the results of the automation, such as the endotoxin assays in this example, are processed and may be stored in memory, such as the databases as described above.

Endotoxin Testing is an essential quality control (QC) test used across the medical and bioscience industries to ensure safety of medical products used to treat human and animal patients. Errors or inefficiency in these testing steps can create unacceptable backlogs in production and significantly affect both total costs and timely product release. Multiple test methods exist for endotoxin testing, and regardless of which method a lab is using, the tester will be required to perform numerous pipetting and data entry steps. Labs which have not automated these pipetting and data entry steps require additional resources to perform steps that are tedious and error prone.

To address these issues, a next-generation Automated Endotoxin Testing platform is provided that through process optimization and automation of routine manual tasks associated with endotoxin testing will be able to streamline and improve the performance of the QC laboratory. The automation points are targeted to maximize return on investment through reduction and savings in time and the reduction of error associated with performance of manual tasks, and overall cost savings.

In one aspect of the disclosure, the Automated Endotoxin Testing platform is a modular platform product based on the WinKQCL™ Endotoxin Detection software. This is a comprehensive custom solution comprising robotic liquid handling systems, microplate readers and reagents, and interconnected software applications to robotics management software, LIMS, CAPA systems, or our MODA™ EM Task Manager, and emphasizes a flexible, configurable means of sharing data and tasks between systems.

As will be described below, data will be shown demonstrating, for example, the ability of robotic systems to reproducibly and reliably perform the preparation of standards, complex routines and/or dilution schemes necessary to endotoxin testing, and to demonstrate the efficiency, accuracy, and effectiveness of an automated solution when implemented in a large-scale fashion.

Endotoxin Testing is an essential quality control (QC) test used for release testing in the pharmaceutical industry to ensure the safety of parenteral drugs and medical devices, as well as a commonly executed quality control test for countless other raw material products sold into these markets. However, because of the strict precision required and yet the routine nature of the testing process, human error creeps into this process regardless of the best efforts of managers and staff. Nonetheless, the routine nature of endotoxin testing also makes it amenable to an automated solution, which can reduce the potential for human error substantially. A full implementation of an automated solution for endotoxin testing will likely lead to the streamlining and improvement of performance in the QC lab, and through process optimization, result in time savings, fewer errors, and overall cost savings.

In light of the increased demand for more thorough and comprehensive endotoxin testing, for example, for large-volume manufacturers, an add-on automation module is provided to the WinKQCL™ Endotoxin Detection software. In aspects, the WinKQCL™ Automation Module simplifies the process of setting up an automated endotoxin testing run and supports selection and use of existing WinKQCL™ Templates. When a WinKQCL™ Template or templates are selected, a layout map of the robot deck is dynamically generated and displayed. The map provides instructions for positioning labware and reagents on the robot deck and also calculates and displays the required volumes for each liquid used in the assay. Block components displayed on the deck layout map correspond to physical grid locations on the robot deck. The map includes a software checklist with each item in the checklist corresponding to an item on the robot deck. Each item in the checklist must be confirmed (location, volume, etc.) prior to running the assay(s).

In yet another aspect of the disclosure, upon initiation of the assay, the robotic control code to perform the assay is generated dynamically, based entirely on the selected WinKQCL™ template (no programming or robotic scripting knowledge is required). Once the automated assay is initiated the analyst can walk away. The robot executes all processing required to complete the run, including microplate transfers in and out of the microplate reader at the appropriate times for incubation. Once the microplate setup is completed, the microplate is transferred to the microplate reader, and when the assay is finished, the WinKQCL™ Software automatically reads the microplate and saves the results to the database. The WinKQCL™ Automation Module provides a simple and reliable front end to the robotic process, and removes or greatly reduces the potential for human error in the setup, pipetting steps, and calculations.

Ease and utility of the software in setting up standard curves and complicated dilution schemes, and the accuracy of the robotic system in pipetting standards and samples is at least achieved. In addition, data readily demonstrates the feasibility and accuracy of robotic pipetting in a large-scale setting, and demonstrates the advantages of an automated solution of the savings in time and the reduction of error associated with performance of manual tasks, and overall cost savings.

As will be described below, various types of equipment may be used in the examples of the disclosure. For example, they may include: Tecan Freedom EVO®150 robotic platform, utilizing the Freedom EVOware® Software, Version 2.6, Service Pack 3, the Tecan Sunrise™ Plate Reader, the Lonza WinKQCL™ Endotoxin Detection and Analysis Software, along with the Lonza Endotoxin Automation Software Module, etc.

Reagents, for example, may include: Lonza Limulus Amebocyte Lysate Kinetic-QCL™, Cat. No. 50-650U; Lonza USP Reference Standard Endotoxin (RSE), Cat. No. E700; and Lonza LAL Reagent Water, W50-100 or equivalent, etc.

Consumables, for example, may include: Lonza Pyrogen-Free Dilution Tubes 13×100 mm without Caps, N207; Lonza LAL Reagent Grade Multi-well Plates, Cat. No. 25-340; Lonza Eppendorf Biopur® Pipette Tips, 1000 µL, Cat. No. 25-417; Lonza Eppendorf Biopur® Pipette Tips, 200 µL, Cat. No. 25-415; and Lonza Endotoxin-free Reagent Reservoirs, Cat. No. 190035.

Figure 13:
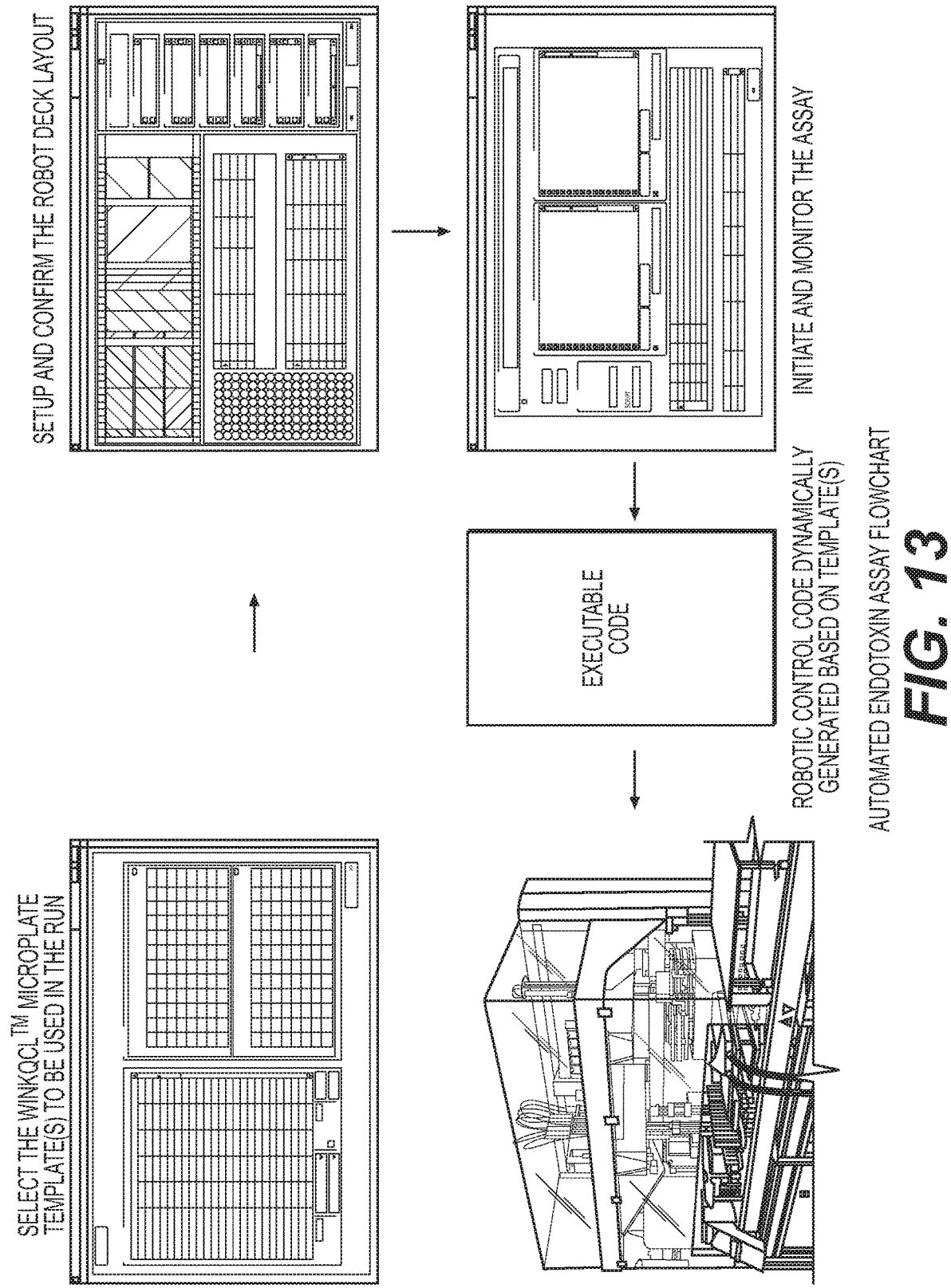
FIG. 13 illustrates a flow diagram in accordance with one or more aspects of the invention.

FIG. 13 illustrates a flow diagram of the steps required to execute an automated endotoxin testing run. First, select the WinKQCL™ Microplate template(s) to be used in the automated run. The list of microplate templates is imported directly from the WinKQCL™ Database. The worklist templates are imported to WinKQCL™ Software from a central database such as LIMS, CAPA system, or our MODA™ EM Task Manager. Dilution and PPC requirements specified within each template will be accommodated by the software. Second, setup and confirm the robot deck layout. Third, initiate the assay. Results may be exported to a LIMS, CAPA, MODA, or other system if desired, emphasizing the flexible, configurable means of sharing data and tasks between systems.

Figure 15:
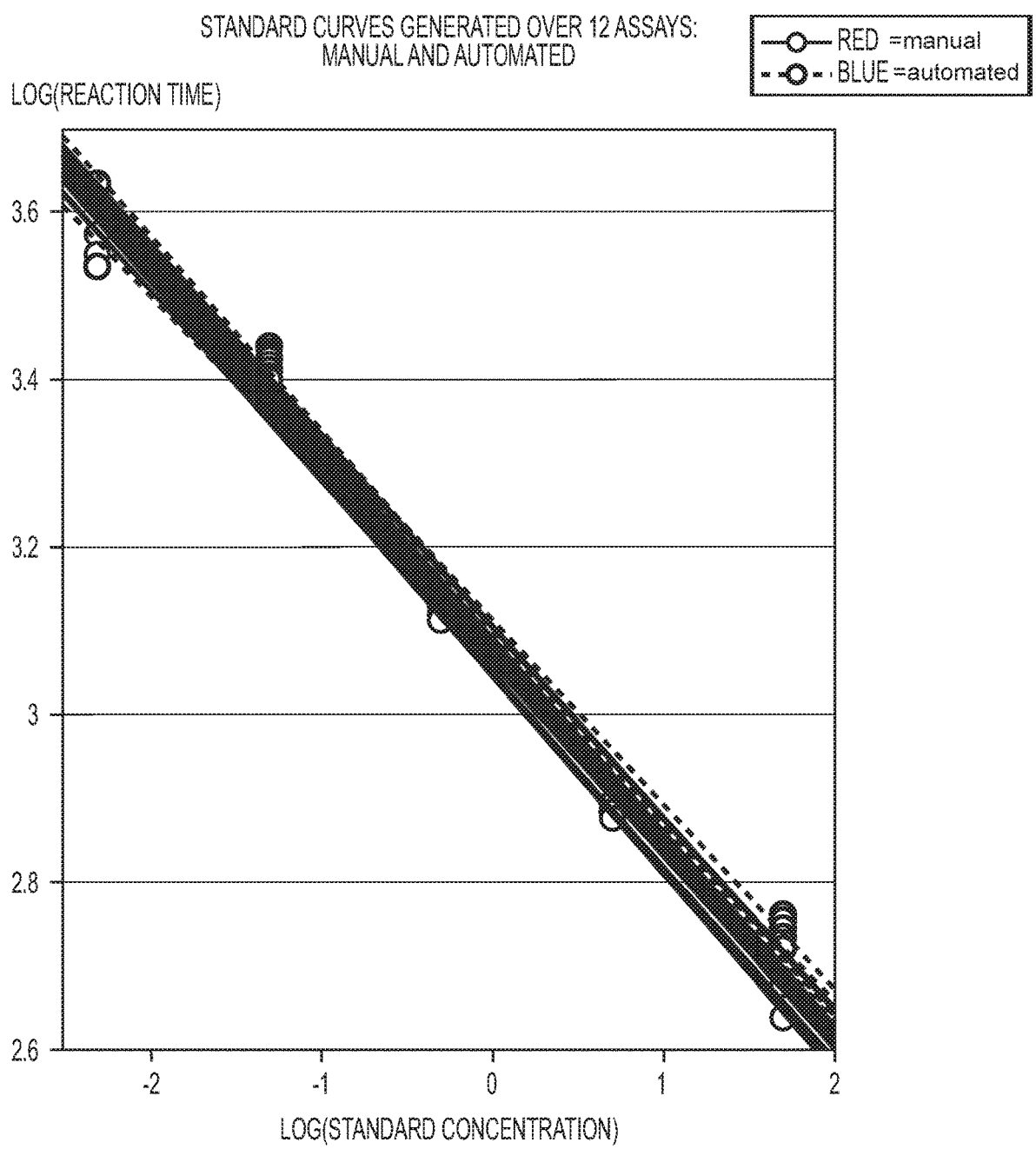
FIGS. 15 to 17 illustrate graphs in accordance with one or more aspects of the invention.

FIGS. 14 and 15 show a comparison of 12 standard curves generated either manually or by the robot.

FIG. 14 illustrates a chart that has the mean reaction times for the 12 manual and robot-generated standard curves. As seen in the % CV's for the standards, all of the CV's are below 3%, and most are near 2% CV or below, which may be well within industry standards, as may be understood by one of ordinary skill in the art.

FIG. 15 shows all 24 manual and robot-generated standard curves superimposed, with robotic standard curves in dashed lines and the manual standard curves superimposed over these in sold lines. All of the standard curves pass industry standards and are valid curves. These data indicate that the robot generated standard curves and the manually generated standard curves are comparable, as may be understood by one of ordinary skill in the art.

Figure 16:
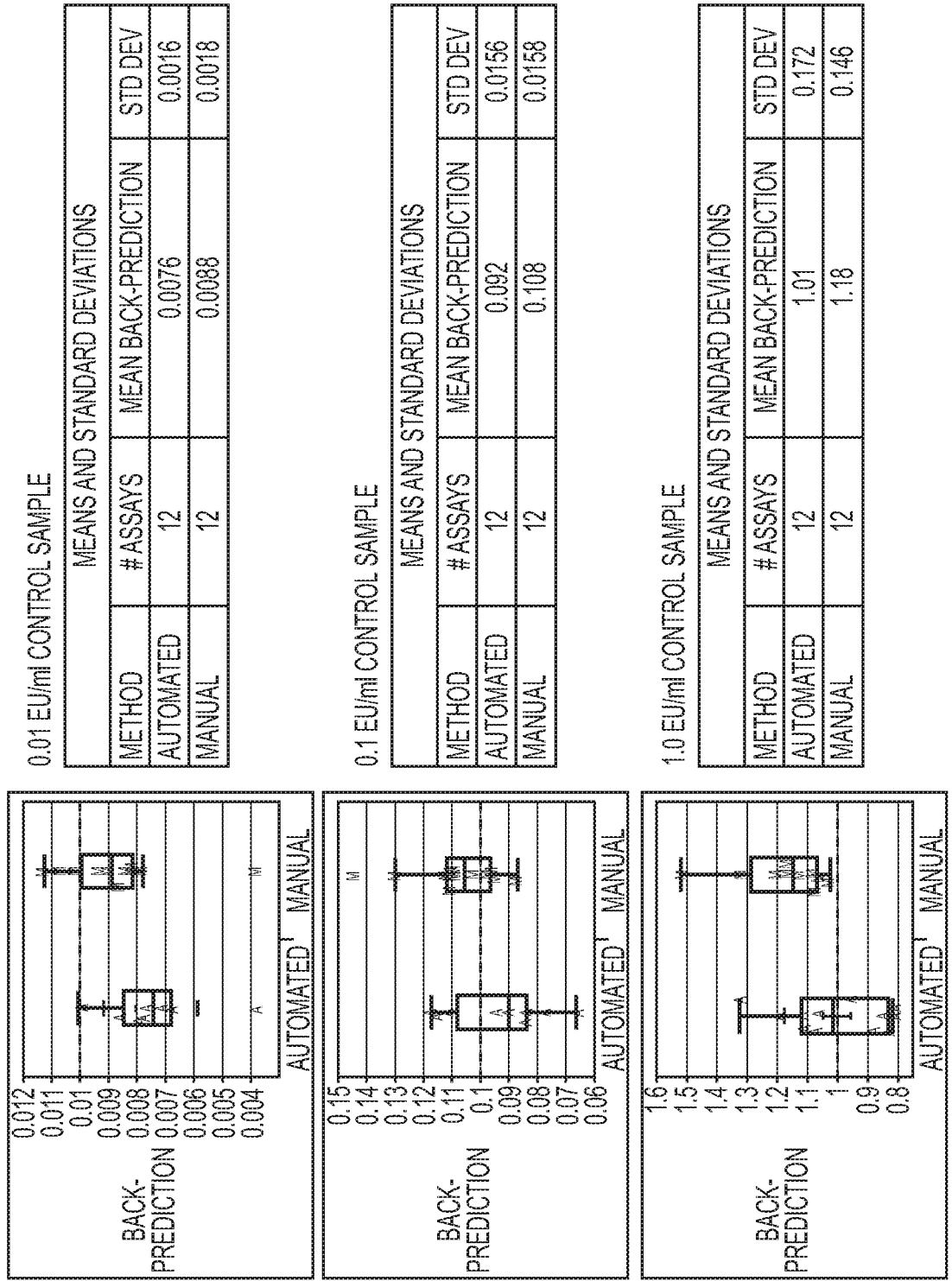
Figure 17:
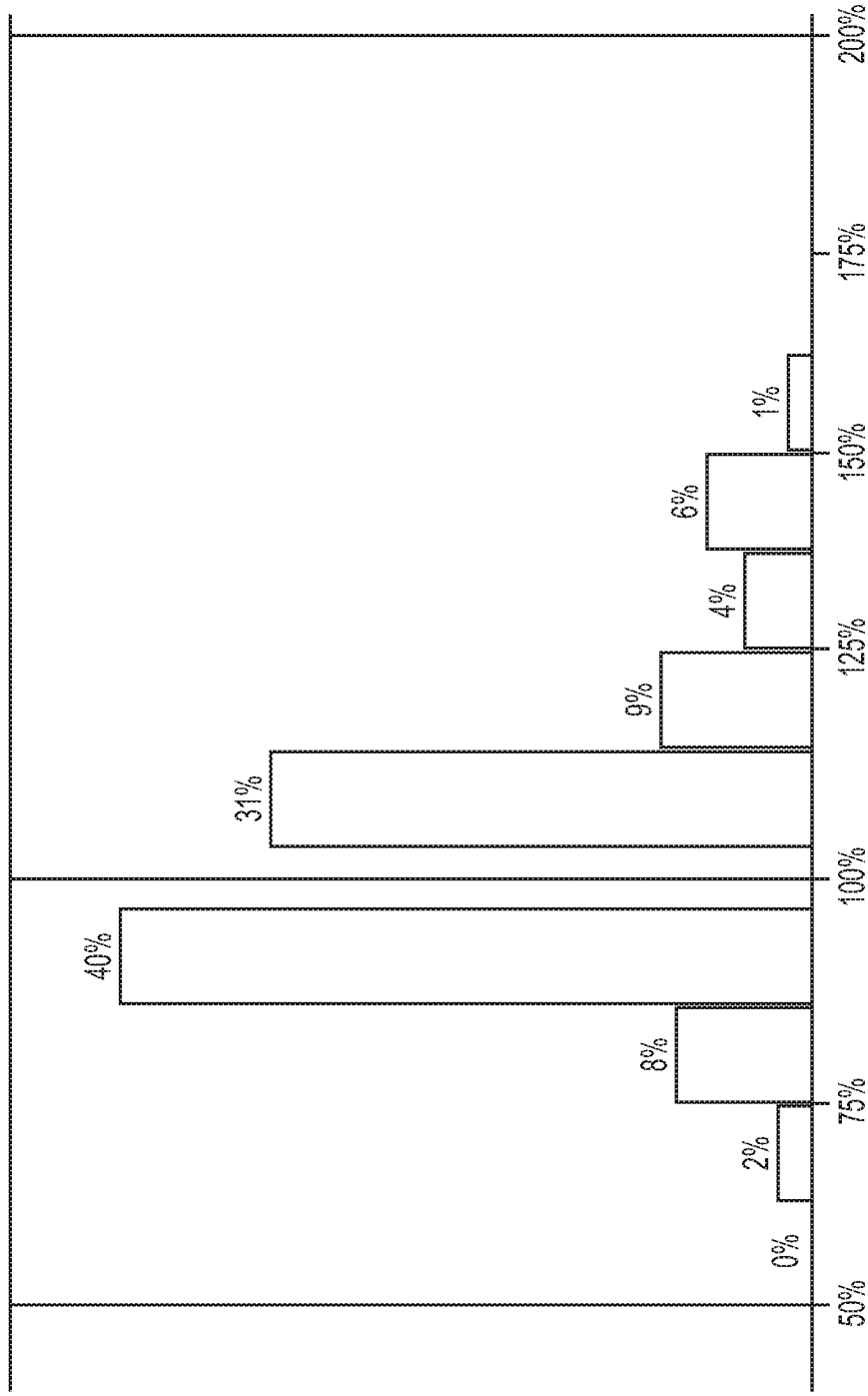

FIGS. 16 and 17 show the results from an automated versus manual endotoxin comparison study, and the PPC recovery results for 1 EU/mL samples that were diluted and tested for the recovery of 0.5 EU/mL spikes using the automated system.

In FIG. 16, known endotoxin concentrations of 0.01 EU/ml, 0.1 EU/ml and 1.0 EU/ml were tested both on the automated system and manually over 12 assays. The data shows that the automated system results and the manual results are nearly identical, as may be understood by one of ordinary skill in the art.

In FIG. 17, Samples and dilutions contained a 0.5 EU/mL PPC spike. The data shows that for the spike recovery 100% of the 103 measurements fell within the acceptable 50%-200% recovery range (black lines), as may be understood by one of ordinary skill in the art.

FIG. 18 shows data obtained from a large-scale automation solution. Although a semi-automated robotic solution, this system has been in place for over a decade, and is an example of the accuracy and consistency available with a robotic solution. Of the over 25,000 standard curves run, 99.67% of the standard curves passed, with an average % CV of 1.07%, demonstrating effectively the results obtainable with robotic pipetting. Over 500,000 samples (samples and samples+PPC) were tested, with a passing rate of over 97% and a 1.19% CV (for samples alone), as may be understood by one of ordinary skill in the art.

The present invention is advantageous in various ways. The automation (e.g., the generation of the robotic commands), as described in the disclosure, is entirely dynamic. In other words, a user is not required to pre-program or pre-assemble all of the robotic commands for the robotic apparatus prior to the automation process. The automation module may be configured to build, in real-time and/or on the fly, the robotic commands based only on the selected template(s) and the unique characteristics of the template(s).

Moreover, the invention is advantageous in that the automation module automatically and dynamically constructs the deck layout of robotic apparatus for the user to setup and also dynamically determines and calculates all the necessary positions and measurements associated with the laboratory equipment used during the automation, which would otherwise have to be hand-calculated by the user. In at least that regard, the automation module reduces automation time and overall human error.

Endotoxin testing plays a critical role in the release testing of parenteral drugs and medical equipment, as well as in the testing of raw materials entering the manufacturing process in the pharmaceutical industry, and bottlenecks at this point of manufacture can become rate-limiting steps in the efficient manufacture and release of these products.

Because of the increasing demand for monitoring and testing, the dynamic automation described herein and software and systems incorporating said dynamically automated features facilitate the development of an automated system requiring minimal human intervention for performing endotoxin assays that also provide performance that is equivalent to, or better than, the performance of assays that are manually executed by an experienced technician.

The ability of the dynamic automation described herein and software and systems incorporating said dynamically automated features to accurately generate standard curves and easily handle complex dilution schemes is demonstrated herein. For example, the simplicity of the dynamic automation described herein and software and systems incorporating said dynamically automated features requires no programming or robotic scripting knowledge, and results can be easily transferred into and out of existing LIMS, CAPA, MODA, or other databases.

In some aspects, the simplicity of the setup of the robotic deck with the Endotoxin Automation Module is balanced with the demonstrable accuracy of robotic pipetting in a large-scale format. As seen with the data from our customer, the consistency and accuracy of both standard curves and samples in a robotic environment is formidable in both quality and quantity.

As such, the dynamic automation described herein coupled with the appropriate robotic system(s) lays the foundation for a fully-automated platform including endotoxin testing platforms, with complete interconnectivity with a variety of client databases, that should lead to an increase in throughput and accuracy, reduction in human error, reduction of the working time required by technicians to implement testing, reduction of ergonomic stress and repetitive strain injuries, and an overall improvement in efficiency.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof. Although the disclosure uses terminology and acronyms that may not be familiar to the layperson, those skilled in the art will be familiar with the terminology and acronyms used herein.

What is claimed is:

1. A system for dynamic automation of an endotoxin assay, the system comprising:
    a robotic apparatus having a robot and a robot deck;
    at least one computing device having stored in one or more databases thereof one or more selectable microplate templates, the computing device for executing stored instructions to:
        receive a first map template of a first microplate used for a first assay,
        dynamically generate a plurality of robotic commands based on the received first map template, and
        send the generated plurality of robotic commands to the robot of the robotic apparatus for performing the dynamic automation,
    wherein the at least one computing device dynamically determines deck layout information for the robot deck based on the first map template, the robot decking having one or more stations for conducting the first assay associated with the first microplate of the first map template.

2. The system of claim 1, wherein the deck layout information includes one or more of: (i) what equipment is to be used for the dynamic automation at each of the one or more stations on the robot deck, (ii) where the equipment is to be positioned at each of the one or more stations on the robot deck, and (iii) calculations of one or more measurements associated with the equipment.

3. The system of claim 2, wherein the at least one computing device receives confirmation that the robot deck has been set up in accordance with the dynamically determined deck layout information.

4. The system of claim 1, wherein the at least one computing device processes results of the automation and stores the results in memory.

5. The system of claim 1, wherein the at least one computing device receives a second map template of a second microplate different from the first microplate used for a second assay, and the plurality of the robotic commands being dynamically generated based on the received first and second map templates.

6. The system of claim 5, wherein the first assay and the second assay are conducted during a same automation run.

7. The system of claim 1, wherein each microplate template corresponds to a different assay.

8. The system of claim 6, wherein the same automation run dynamically automates the first assay and the second assay.

9. The system of claim 1, wherein the one or more stations includes one or more of: (i) a reagent rack station, (ii) a sample tube rack station, (iii) a microplate holder station, (iv) a microplate warmer station, and (v) a pipette tip holder station.

10. The system of claim 2, wherein the equipment includes one or more of: (i) at least one trough, (ii) at least one vial, (iii) at least one standards tube, (iv) at least one auxiliary tube, (v) at least one sample tube, and (vi) at least one microplate reader.

11. The system of claim 1, wherein the first map template has a grid with a plurality of cells, each of the cells corresponding to a location of a well on the first microplate.

12. The system of claim 5, wherein the first map template and the second map template are constructed by a user prior to the dynamic automation.

13. The system of claim 5, wherein the at least one computing device displays on an interface the first map template and the second map template for preview.

14. The system of claim 1, wherein the dynamic automation includes: one or more of (1) applying required sample dilutions, (2) placing samples on microplate(s), (3) placing water blanks on microplate(s), (4) creating dilutions required for standard curves, (5) placing standards dilutions on microplate(s), (6) adding PPC spikes to required wells on microplate(s), (7) moving microplate(s) to a microplate reader for incubation, (8) reconstituting reagent in each vial while microplate(s) incubate, (9) removing microplate(s) from microplate reader and returning microplate(s) to plate warmer on robot deck, (10) adding reagent to each required well on microplate(s), (11) moving microplate(s) to microplate reader for processing, and (12) reading microplate(s) and processing results of automation run following placing of microplate(s) in microplate reader.

* * * * *